(12) United States Patent
Dalmatov

(10) Patent No.: US 11,755,224 B2
(45) Date of Patent: Sep. 12, 2023

(54) STORING DATA IN SLICES OF DIFFERENT SIZES WITHIN DIFFERENT STORAGE TIERS

(71) Applicant: EMC IP Holding Company LLC, Hopkinton, MA (US)

(72) Inventor: Nickolay Alexandrovich Dalmatov, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 710 days.

(21) Appl. No.: 16/078,378

(22) PCT Filed: Jul. 27, 2017

(86) PCT No.: PCT/RU2017/000556
§ 371 (c)(1),
(2) Date: Aug. 21, 2018

(87) PCT Pub. No.: WO2019/022631
PCT Pub. Date: Jan. 31, 2019

(65) Prior Publication Data
US 2021/0200458 A1    Jul. 1, 2021

(51) Int. Cl.
*G06F 12/00*       (2006.01)
*G06F 13/00*       (2006.01)
(Continued)

(52) U.S. Cl.
CPC .......... *G06F 3/0647* (2013.01); *G06F 3/0611* (2013.01); *G06F 3/0683* (2013.01); *G11B 5/012* (2013.01)

(58) Field of Classification Search
CPC .... G06F 3/0647; G06F 3/0611; G06F 3/0683; G11B 5/012
(Continued)

(56) References Cited

U.S. PATENT DOCUMENTS 4,874,164 A * 10/1989 Miner .................... A63F 13/00
                                                        345/545
5,103,499 A *  4/1992 Miner .................... G09G 5/024
                                                        345/503
(Continued)

FOREIGN PATENT DOCUMENTS

RU          2235356 C2      8/2004
WO        20160072971       5/2016

OTHER PUBLICATIONS

Tomek, "EMC VNX-FAST VP EXPLAINED—STORAGE FREAK", retrieved from http://www.storagefreak.net/2014/06/emc-vnx-fast-vp-explained, Jun. 2, 2014, pp. 1-6.
(Continued)

*Primary Examiner* — Sheng Jen Tsai
(74) *Attorney, Agent, or Firm* — BainwoodHuang

(57) ABSTRACT

A technique manages data in slices of difference sizes within different storage tiers. The technique involves, based on access activity for first data currently residing within a first slice having a first size, selecting a target set of storage devices within which to store the first data from among multiple sets of storage devices. The technique further involves moving the first data from the first slice having the first size to a second slice having a second size that is different from the first size. The technique further involves, after the first data is moved from the first slice to the second slice, storing the second slice in the target set of storage devices.

27 Claims, 16 Drawing Sheets

(51) Int. Cl.
*G06F 3/06* (2006.01)
*G11B 5/012* (2006.01)

(58) Field of Classification Search
USPC .......................................... 711/117
See application file for complete search history.

(56) References Cited

U.S. PATENT DOCUMENTS

| | | | | |
|---|---|---|---|---|
| 5,170,477 | A * | 12/1992 | Potter | G06F 13/4018 |
| | | | | 711/201 |
| 5,345,584 | A | 9/1994 | Hill | |
| 5,734,861 | A | 3/1998 | Cohn et al. | |
| 6,173,306 | B1 | 1/2001 | Raz et al. | |
| 6,317,762 | B1 * | 11/2001 | Okawa | G06T 11/60 |
| | | | | 382/187 |
| 6,542,941 | B1 * | 4/2003 | Simpson, III | G06F 3/067 |
| | | | | 710/33 |
| 6,615,282 | B1 * | 9/2003 | Futral | G06F 13/385 |
| | | | | 710/39 |
| 7,281,030 | B1 * | 10/2007 | Davis | H04L 67/1097 |
| | | | | 709/212 |
| 8,583,838 | B1 * | 11/2013 | Marshak | G06F 3/0649 |
| | | | | 710/16 |
| 8,706,960 | B1 | 4/2014 | Ives et al. | |
| 8,935,493 | B1 * | 1/2015 | Dolan | G06F 3/064 |
| | | | | 711/161 |
| 8,949,483 | B1 * | 2/2015 | Martin | G06F 3/0647 |
| | | | | 710/16 |
| 8,976,636 | B1 * | 3/2015 | Martin | G06F 3/0644 |
| | | | | 369/30.01 |
| 9,047,017 | B1 * | 6/2015 | Dolan | G06F 3/0685 |
| 9,052,830 | B1 * | 6/2015 | Marshak | G06F 3/0665 |
| 9,256,381 | B1 * | 2/2016 | Fultz | G06F 3/0617 |
| 9,311,002 | B1 | 4/2016 | Scott et al. | |
| 9,330,105 | B1 | 5/2016 | Duprey et al. | |
| 9,354,813 | B1 * | 5/2016 | Dolan | G06F 3/0647 |
| 9,378,136 | B1 * | 6/2016 | Martin | G06F 12/0246 |
| 9,383,940 | B1 | 7/2016 | Ives et al. | |
| 9,477,407 | B1 * | 10/2016 | Marshak | G06F 3/061 |
| 9,507,887 | B1 * | 11/2016 | Wang | G06F 3/0647 |
| 9,594,514 | B1 * | 3/2017 | Bono | G06F 3/0679 |
| 9,665,288 | B1 * | 5/2017 | Aharoni | G06F 3/0683 |
| 9,665,630 | B1 * | 5/2017 | Bigman | G06F 3/0647 |
| 9,684,593 | B1 | 6/2017 | Chen et al. | |
| 9,703,664 | B1 * | 7/2017 | Alshawabkeh | G06F 3/067 |
| 9,898,224 | B1 * | 2/2018 | Marshak | G06F 3/0647 |
| 9,916,090 | B1 * | 3/2018 | Can | G06F 3/0649 |
| 9,940,033 | B1 * | 4/2018 | Alshawabkeh | G06F 3/0653 |
| 9,965,218 | B1 * | 5/2018 | Martin | G06F 3/0649 |
| 9,984,000 | B2 * | 5/2018 | Criswell | G06F 12/0868 |
| 10,013,170 | B1 * | 7/2018 | Sahin | G06F 3/0631 |
| 10,025,523 | B1 | 7/2018 | Dagan et al. | |
| 10,073,621 | B1 | 9/2018 | Foley et al. | |
| 10,078,569 | B1 | 9/2018 | Alshawabkeh et al. | |
| 10,089,026 | B1 | 10/2018 | Puhov et al. | |
| 10,095,425 | B1 * | 10/2018 | Martin | G06F 3/0665 |
| 10,126,988 | B1 | 11/2018 | Han et al. | |
| 10,140,041 | B1 | 11/2018 | Dong et al. | |
| 10,146,447 | B1 | 12/2018 | Dong et al. | |
| 10,146,456 | B1 | 12/2018 | Gao et al. | |
| 10,146,459 | B1 | 12/2018 | Gao et al. | |
| 10,146,624 | B1 | 12/2018 | Gong et al. | |
| 10,146,646 | B1 | 12/2018 | Foley et al. | |
| 10,152,254 | B1 | 12/2018 | Kang et al. | |
| 10,254,970 | B1 * | 4/2019 | Martin | G06F 3/061 |
| 10,261,717 | B1 * | 4/2019 | Martin | G06F 3/0646 |
| 10,282,107 | B1 * | 5/2019 | Martin | G06F 3/0689 |
| 10,521,124 | B1 * | 12/2019 | Aharoni | G06F 3/0631 |
| 10,809,931 | B1 * | 10/2020 | Martin | G06F 3/061 |
| 2001/0018730 | A1 * | 8/2001 | Toshitani | H03L 7/091 |
| | | | | 711/167 |
| 2002/0095532 | A1 | 7/2002 | Surugucchi et al. | |
| 2003/0065883 | A1 | 4/2003 | Bachmat | |
| 2003/0163457 | A1 * | 8/2003 | Yano | G06F 3/0613 |
| 2003/0217232 | A1 * | 11/2003 | Audityan | G06F 13/4208 |
| | | | | 711/141 |
| 2004/0230765 | A1 * | 11/2004 | Funahashi | G06F 13/4013 |
| | | | | 711/201 |
| 2004/0243643 | A1 * | 12/2004 | Hattrup | H04L 67/1097 |
| 2005/0097273 | A1 * | 5/2005 | Kanai | G06F 3/0613 |
| | | | | 711/147 |
| 2005/0182863 | A1 * | 8/2005 | Wrigley | G06F 13/28 |
| | | | | 710/22 |
| 2006/0161807 | A1 | 7/2006 | Dawkins | |
| 2006/0212746 | A1 | 9/2006 | Amegadzie et al. | |
| 2008/0028164 | A1 | 1/2008 | Ikemoto et al. | |
| 2008/0059749 | A1 | 3/2008 | Gerber et al. | |
| 2008/0109601 | A1 | 5/2008 | Klemm et al. | |
| 2009/0132770 | A1 * | 5/2009 | Lin | G06F 12/0886 |
| | | | | 711/154 |
| 2010/0250501 | A1 | 9/2010 | Mandagere et al. | |
| 2011/0082999 | A1 * | 4/2011 | Lai | G06F 9/3824 |
| | | | | 711/201 |
| 2011/0167221 | A1 * | 7/2011 | Pangal | G06F 3/0608 |
| | | | | 711/117 |
| 2011/0225379 | A1 * | 9/2011 | Eguchi | G06F 3/065 |
| | | | | 711/E12.002 |
| 2012/0166723 | A1 * | 6/2012 | Araki | G06F 12/0246 |
| | | | | 711/113 |
| 2012/0259901 | A1 | 10/2012 | Lee et al. | |
| 2013/0179657 | A1 * | 7/2013 | Isomura | G06F 3/0685 |
| | | | | 711/E12.002 |
| 2013/0275653 | A1 | 10/2013 | Ranade et al. | |
| 2013/0282994 | A1 * | 10/2013 | Wires | G06F 3/0604 |
| | | | | 709/212 |
| 2014/0082310 | A1 * | 3/2014 | Nakajima | G06F 12/023 |
| | | | | 711/E12.103 |
| 2014/0095439 | A1 | 4/2014 | Ram | |
| 2014/0188870 | A1 * | 7/2014 | Borthakur | G06F 16/22 |
| | | | | 707/736 |
| 2014/0325121 | A1 * | 10/2014 | Akutsu | G06F 3/0647 |
| | | | | 711/103 |
| 2014/0325262 | A1 * | 10/2014 | Cooper | G06F 11/108 |
| | | | | 714/6.22 |
| 2015/0074340 | A1 * | 3/2015 | Criswell | G06F 12/122 |
| | | | | 711/103 |
| 2015/0127912 | A1 * | 5/2015 | Solihin | G06F 12/0848 |
| | | | | 711/125 |
| 2015/0134926 | A1 | 5/2015 | Yang et al. | |
| 2015/0324255 | A1 * | 11/2015 | Kochunni | G06F 11/3433 |
| | | | | 711/162 |
| 2016/0188401 | A1 | 6/2016 | Shen et al. | |
| 2016/0191665 | A1 * | 6/2016 | Kang | G06F 3/065 |
| | | | | 709/205 |
| 2016/0196075 | A1 * | 7/2016 | Matsushita | G06F 3/0647 |
| | | | | 711/103 |
| 2016/0224249 | A1 * | 8/2016 | Desai | G06F 3/0667 |
| 2016/0342364 | A1 * | 11/2016 | Ono | G06F 12/00 |
| 2016/0342661 | A1 * | 11/2016 | Kumarasamy | G06F 16/2452 |
| 2016/0350021 | A1 * | 12/2016 | Matsushita | G06F 3/0647 |
| 2016/0364149 | A1 | 12/2016 | Klemm et al. | |
| 2017/0285972 | A1 * | 10/2017 | Dalmatov | G06F 3/0616 |
| 2017/0285973 | A1 * | 10/2017 | Dalmatov | G06F 3/0653 |

OTHER PUBLICATIONS

EMC, "EMC Celerra Automated Storage Tiering Applied Best Practices Guide", Aug. 2009, P/N h6499, pp. 1-36.
EMC, "EMC VNX@ Unified Best Practices for Performance Applied Best Practice Guide", Oct. 2005, P/N H10938.8, pp. 1-37.
EMC, "Managing Data Relocation in Storage Systems", U.S. Appl. No. 13/929,664, filed Jun. 27, 2013.
International Search Report and the Written Opinion from International Searching Authority (RU) for International Application No. PCT/RU2017/000556, dated Mar. 29, 2018, 9 pages.

* cited by examiner

STORING DATA IN SLICES OF DIFFERENT SIZES WITHIN DIFFERENT STORAGE TIERS

TECHNICAL FIELD

The present invention relates to a system and method for managing data placement in data storage arrays using auto-tiering techniques that include adaptive granularity mechanisms. In particular, such techniques are able to store data in slices of different sizes within different storage tiers.

BACKGROUND OF THE INVENTION

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. These may or may not correspond to the actual physical drives. Allowing multiple host systems to access the single data storage system allows the host systems to share data stored therein.

SUMMARY OF THE INVENTION

Improved techniques involve managing data via placement of the data in storage slices of different sizes within different storage tiers. Such storage tiers may include tiers of different access speeds such as a first tier of solid state drives (SSDs), a second tier of high speed magnetic hard disk drives (HDDs), a third tier of slower HDDs, and so on. Additionally, such storage tiers may include a tier of higher endurance SSDs such as single-level cell (SLC) SSDs and another tier of lower endurance SSDs such as multi-level cell (MLC) SSDs, and so on. In such an environment, data may be placed in different sized storage slices within different storage tiers to improve performance such as smaller slices in the faster tiers, and larger slices in the slower tiers. Additionally, with regard to placement of data the smaller storage slices, data that is heavily written may be placed in a tier of higher endurance SSDs while data that is less heavily written may be placed in a tier of lower endurance SSDs.

One embodiment is directed to a method of managing the data which is performed in data storage equipment. The method includes, based on access activity for first data currently residing within a first slice having a first size, selecting a target set of storage devices within which to store the first data from among multiple sets of storage devices. The method further includes moving the first data from the first slice having the first size to a second slice having a second size that is different from the first size. The method further includes, after the first data is moved from the first slice to the second slice, storing the second slice in the target set of storage devices.

In some arrangements, the data storage equipment includes (i) primary memory and (ii) secondary storage coupled to the primary memory. The secondary storage includes the multiple sets of storage devices. In these arrangements, moving the first data from the first slice to the second slice includes reading the first data from a source set of storage devices into the second slice while the second slice resides in the primary memory. Additionally, storing the second slice in the target set of storage devices includes writing the second slice from the primary memory into the target set of storage devices.

In some arrangements, each of the multiple sets of storage devices of the secondary storage operates as different storage tier that provides difference data access performance, the source set of storage devices operating as a first storage tier that provides first data access performance, and the target set of storage devices operating as a secondary storage tier that provides second data access performance that is different from the first data access performance. In these arrangements, selecting the target set of storage devices includes performing a tier selection operation to identify, as a destination tier for the first data, the secondary storage tier based on the access activity for the first data.

In some arrangements, the source set of storage devices is operative to store slices having the first size, and the target set of storage devices is operative to store slices having the second size. In these arrangements, the access activity for the first data indicates a decrease in recent access activity for the first data. Additionally, performing the tier selection operation to identify, as the destination tier for the first data, the secondary storage tier based on the access activity for the first data includes choosing the secondary storage tier in place of the first storage tier in response to the decrease in recent access activity for the first data.

In some arrangements, the source set of storage devices provides average data access time that is faster than that of the target set of storage devices. In these arrangements, the first size is smaller than the second size. Additionally, reading the first data from the source set of storage devices into the second slice while the second slice resides in the primary memory includes merging, within the primary memory, the first slice having the first size with a set of other slices having the first size to form the second slice.

In some arrangements, the source set of storage devices is operative to store slices having the first size, and the target set of storage devices is operative to store slices having the second size. In these arrangements, the access activity for the first data indicates an increase in recent access activity for the first data. Additionally, performing the tier selection operation to identify, as the destination tier for the first data, the secondary storage tier based on the access activity for the first data includes choosing the secondary storage tier in place of the first storage tier in response to the increase in recent access activity for the first data.

In some arrangements, the source set of storage devices provides average data access time that is slower than that of the target set of storage devices. In these arrangements, the first size is larger than the second size. Additionally, reading the first data from the source set of storage devices into the second slice while the second slice resides in the primary memory includes partitioning, within the primary memory, the first slice having the first size into multiple other slices having the second size, the second slice being a particular one of the other slices that contains the first data.

In some arrangements, the source set of storage devices is operative to store slices having the first size, and the target set of storage devices is operative to store slices having the second size. In these arrangements, the access activity for the first data indicates higher write activity for the first data relative to other data within the multiple sets of storage devices. In some arrangements, performing the tier selection operation to identify, as the destination tier for the first data, the secondary storage tier based on the access activity for the first data includes choosing the secondary storage tier in place of the first storage tier in response to the higher write activity for the first data relative to the other data within the multiple sets of storage devices.

In some arrangements, the source set of storage devices provides average data access time that is slower than that of the target set of storage devices. In these arrangements, the first size is smaller than the second size. Additionally, the multiple sets of storage devices includes a set of single-level cell solid state drives and a set of multi-level cell solid state drives. Furthermore, choosing the secondary storage tier includes picking the set of single-level cell solid state drives, as the target set of storage devices, over the set of multi-level cell solid state drives.

In some arrangements, the source set of storage devices is operative to store slices having the first size, and the target set of storage devices is operative to store slices having the second size. In these arrangements, the access activity for the first data indicates higher read activity for the first data relative to other data within the multiple sets of storage devices. Furthermore, performing the tier selection operation to identify, as the destination tier for the first data, the secondary storage tier based on the access activity for the first data includes choosing the secondary storage tier in place of the first storage tier in response to the higher read activity for the first data relative to the other data within the multiple sets of storage devices.

In some arrangements, the source set of storage devices provides average data access time that is slower than that of the target set of storage devices. In these arrangements, the first size is smaller than the second size. Additionally, the multiple sets of storage devices includes a set of single-level cell solid state drives and a set of multi-level cell solid state drives. Furthermore, choosing the secondary storage tier includes picking the set of multi-level cell solid state drives, as the target set of storage devices, over the set of single-level cell solid state drives.

In some arrangements, the data storage equipment is operative to receive host input/output (I/O) requests from a set of host computers, and store host data within the secondary storage and load the host data from the secondary storage in response to the host I/O requests. In these arrangements, the method further includes updating a performance data repository in response to each host I/O request from the set of host computers.

In some arrangements, selecting the target set of storage devices within which to store the first data from among the multiple sets of storage devices includes (i) accessing the performance data repository to identify a set of I/O statistics for the first data, and (ii) selecting the target set of storage devices from the multiple sets of storage devices based on the set of I/O statistics for the first data. In some arrangements, the first size is a multiple, N, of the second size, where N is an integer that is greater than 1. In other arrangements, the second size is a multiple, N, of the first size, where N is an integer that is greater than 1. In yet other arrangements, one size is not a multiple of the other size.

In some arrangements, the secondary storage includes a set of solid state drives and a set of magnetic disk drives. In these arrangements, reading the first data from the source set of storage devices includes retrieving the first data from one of the set of solid state drives and the set of magnetic disk drives into the primary memory. Additionally, storing the second slice in the target set of storage devices includes flushing the second slice from the primary memory to the other of the set of solid state drives and the set of magnetic disk drives into the primary memory.

In some arrangements, the secondary storage includes a set of single-level cell solid state drives and a set of multi-level cell solid state drives. In these arrangements, reading the first data from the source set of storage devices includes retrieving the first data from one of the set of single-level cell solid state drives and the set of multi-level cell solid state drives into the primary memory. Additionally, storing the second slice in the target set of storage devices includes flushing the second slice from the primary memory to the other of the set of single-level cell solid state drives and the set of multi-level cell solid state drives.

Another embodiment is directed to data storage equipment which includes a performance data repository, memory, and control circuitry coupled to the performance data repository and the memory. The memory stores instructions which, when carried out by the control circuitry, cause the control circuitry to:

(A) based on access activity read from the performance data repository for first data currently residing within a first slice having a first size, selecting a target set of storage devices within which to store the first data from among multiple sets of storage devices, (B) moving the first data from the first slice having the first size to a second slice having a second size that is different from the first size, and (C) after the first data is moved from the first slice to the second slice, storing the second slice in the target set of storage devices.

Yet another embodiment is directed to a computer program product having a non-transitory computer readable medium which stores a set of instructions to store data within slices of different sizes. The set of instructions, when carried out by computerized circuitry, causing the computerized circuitry to perform a method of:

(A) based on access activity for first data currently residing within a first slice having a first size, selecting a target set of storage devices within which to store the first data from among multiple sets of storage devices;

(B) moving the first data from the first slice having the first size to a second slice having a second size that is different from the first size; and (C) after the first data is moved from the first slice to the second slice, storing the second slice in the target set of storage devices.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in managing data via placement of the data in data slices of different sizes within different storage tiers.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Figure 1:
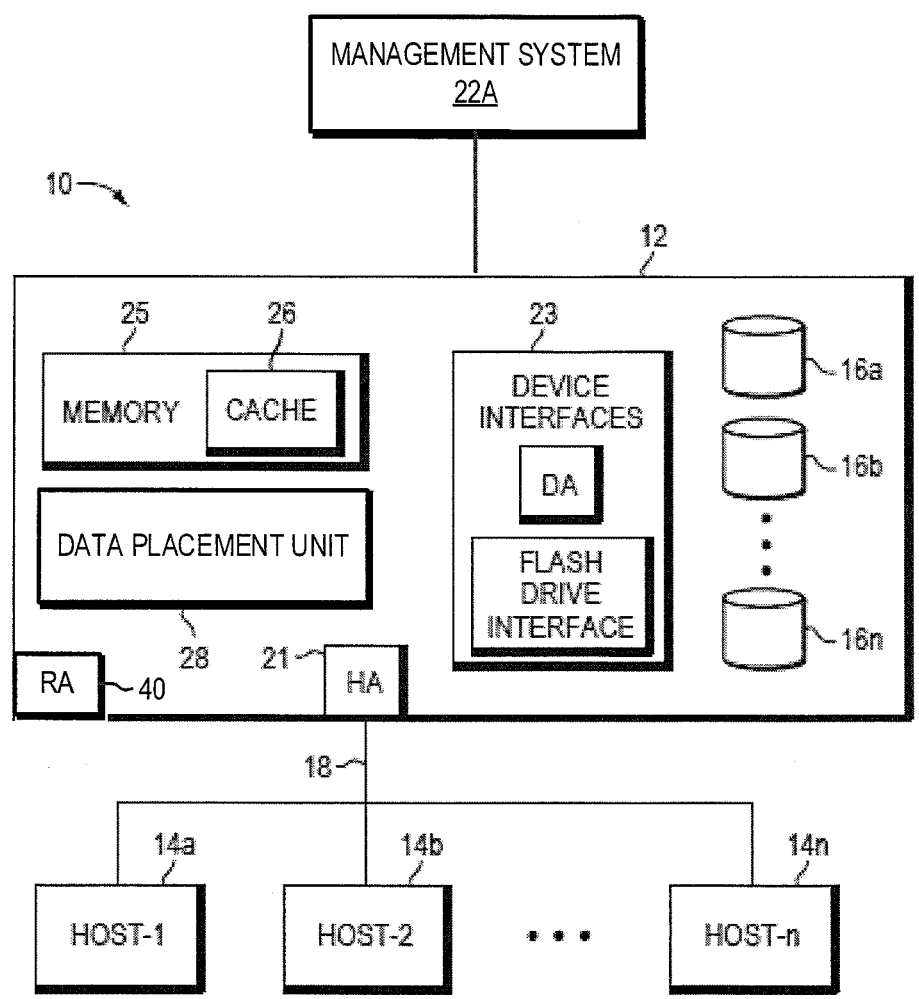
FIG. 1 is an example of a system that may utilize the technique described herein comprising a data storage system connected to host systems through a communication medium.

Referring to FIG. 1, shown is an example of an embodiment of a system that may be used in connection with performing one or more implementations of the current techniques described herein. The system 10 includes a data storage system 12 connected to host systems 14a 14n through communication medium 18. In this embodiment of the computer system 10, the n hosts 14a 14n may access the data storage system 12, for example, in performing input/output (IO) operations or data requests. The communication medium 18 may be any one or more of a variety of networks or other type of communication connections as known to those skilled in the art. The communication medium 18 may be a network connection, bus, and/or other type of data link, such as a hardwire, wireless, or other connections known in the art. For example, the communication medium 18 may be the Internet, an intranet, network (including a Storage Area Network (SAN)) or other wireless or other hardwired connection(s) by which the host systems 14a 14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. The communication medium that may be used to provide the different types of connections between the host computer systems and the data storage system of the system 10 may use a variety of different communication protocols such as SCSI, Fibre Channel, PCIe, iSCSI, NFS, and the like. Some or all of the connections by which the hosts and data storage system may be connected to the communication medium may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrating the techniques herein, reference may be made to a single data storage array by a vendor, such as by EMC Corporation of Hopkinton, Mass. However, the techniques described herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash memory-based SSDs (also referred to herein as "flash disk drives," "flash storage drives", or "flash drives") are one type of SSD that contains no moving mechanical parts.

The flash devices may be constructed using nonvolatile semiconductor NAND flash memory. The flash devices may include one or more SLC (single level cell) devices and/or MLC (multi level cell) devices.

It should be noted that the techniques herein may be used in connection with flash devices comprising what may be characterized as enterprise-grade or enterprise-class SSDs (EFDs) with an expected lifetime (e.g., as measured in an amount of actual elapsed time such as a number of years, months, and/or days) based on a number of guaranteed write cycles, or program cycles, and a rate or frequency at which the writes are performed. Thus, a flash device may be expected to have a usage measured in calendar or wall clock elapsed time based on the amount of time it takes to perform the number of guaranteed write cycles. The techniques herein may also be used with other flash devices, more generally referred to as non-enterprise class flash devices, which, when performing writes at a same rate as for enterprise class drives, may have a lower expected lifetime based on a lower number of guaranteed write cycles.

The techniques herein may be generally used in connection with any type of flash device, or more generally, any SSD technology. The flash device may be, for example, a flash device which is a NAND gate flash device, NOR gate flash device, flash device that uses SLC or MLC technology, and the like, as known in the art. In one embodiment, the one or more flash devices may include MLC flash memory devices although an embodiment may utilize MLC, alone or in combination with, other types of flash memory devices or other suitable memory and data storage technologies. More generally, the techniques herein may be used in connection with other SSD technologies although particular flash memory technologies may be described herein for purposes of illustration. For example, consistent with description elsewhere herein, an embodiment may define multiple storage tiers including one tier of PDs based on a first type of flash-based PDs, such as based on SLC technology, and also including another different tier of PDs based on a second type of flash-based PDs, such as MLC. Generally, the SLC PDs may have a higher write endurance and speed than MLC PDs.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment. Furthermore, the data storage devices 16a-16n may be connected to one or more controllers (not shown). The controllers may include storage devices associated with the controllers. Communications between the controllers may be conducted via inter-controller connections. Thus, the current techniques described herein may be implemented in conjunction with data storage devices that can be directly connected or indirectly connected through another controller.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

A map kept by the storage array may associate logical addresses in the host visible LUs with the physical device addresses where the data actually is stored. The map also contains a list of unused slices on the physical devices that are candidates for use when LUs are created or when they expand. The map in some embodiments may also contains other information such as time last access for all or a subset of the slices or frequency counters for the slice; the time last access or frequency counters. This information can be analyzed to derive a temperature of the slices which can indicate the activity level of data at the slice level.

The map, or another similar map, may also be used to store information related to write activity (e.g., erase count) for multiple drives in the storage array. This information can be used to identify drives having high write related wear relative to other drives having a relatively low write related wear.

The device interface, such as a DA, performs I/O operations on a physical device or drive 16a-16n. In the following description, data residing on a LUN may be accessed by the device interface following a data request in connection with I/O operations that other directors originate. The DA which services the particular physical device may perform processing to either read data from, or write data to, the corresponding physical device location for an I/O operation.

Also shown in FIG. 1 is a management system 22a that may be used to manage and monitor the system 12. In one embodiment, the management system 22a may be a computer system which includes data storage system management software such as may execute in a web browser. A data storage system manager may, for example, view information about a current data storage configuration such as LUNs, storage pools, and the like, on a user interface (UI) in display device of the management system 22a.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations that other directors originate. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® Data Storage System by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

An embodiment in accordance with techniques herein may have one or more defined storage tiers. Each tier may generally include physical storage devices or drives having one or more attributes associated with a definition for that tier. For example, one embodiment may provide a tier definition based on a set of one or more attributes or properties. The attributes may include any one or more of a storage type or storage technology, device performance characteristic(s), RAID (Redundant Array of Independent Disks) group configuration, storage capacity, and the like. RAID groups are known in the art. The PDs of each RAID group may have a particular RAID level (e.g., RAID-1, RAID-5 3+1, RAID-5 7+1, and the like) providing different levels of data protection. For example, RAID-1 is a group of PDs configured to provide data mirroring where each data portion is mirrored or stored on 2 PDs of the RAID-1 group. The storage type or technology may specify whether a physical storage device is an SSD (solid state drive) drive (such as a flash drive), a particular type of SSD drive (such using flash memory or a form of RAM), a type of rotating magnetic disk or other non-SSD drive (such as a 10K RPM rotating disk drive, a 15K RPM rotating disk drive), and the like.

Performance characteristics may relate to different performance aspects of the physical storage devices of a particular type or technology. For example, there may be multiple types of rotating disk drives based on the RPM characteristics of the disk drives where disk drives having different RPM characteristics may be included in different storage tiers. Storage capacity may specify the amount of data, such as in bytes, that may be stored on the drives. An embodiment may define one or more such storage tiers. For example, an embodiment in accordance with techniques herein that is a multi-tiered storage system may define two storage tiers including a first tier of all SSD drives and a second tier of all non-SSD drives. As another example, an embodiment in accordance with techniques herein that is a multi-tiered storage system may define three storage tiers including a first tier of all SSD drives which are flash drives, a second tier of all 15K RPM rotating disk drives, and a third tier of all 10K RPM rotating disk drives. In terms of general expected performance, the SSD or flash tier may be considered the highest performing tier. The second tier of 15K RPM disk drives may be considered the second or next highest performing tier and the 10K RPM disk drives may be considered the lowest or third ranked tier in terms of expected performance. The foregoing are some examples of tier definitions and other tier definitions may be specified and used in an embodiment in accordance with techniques herein.

Figure 2:
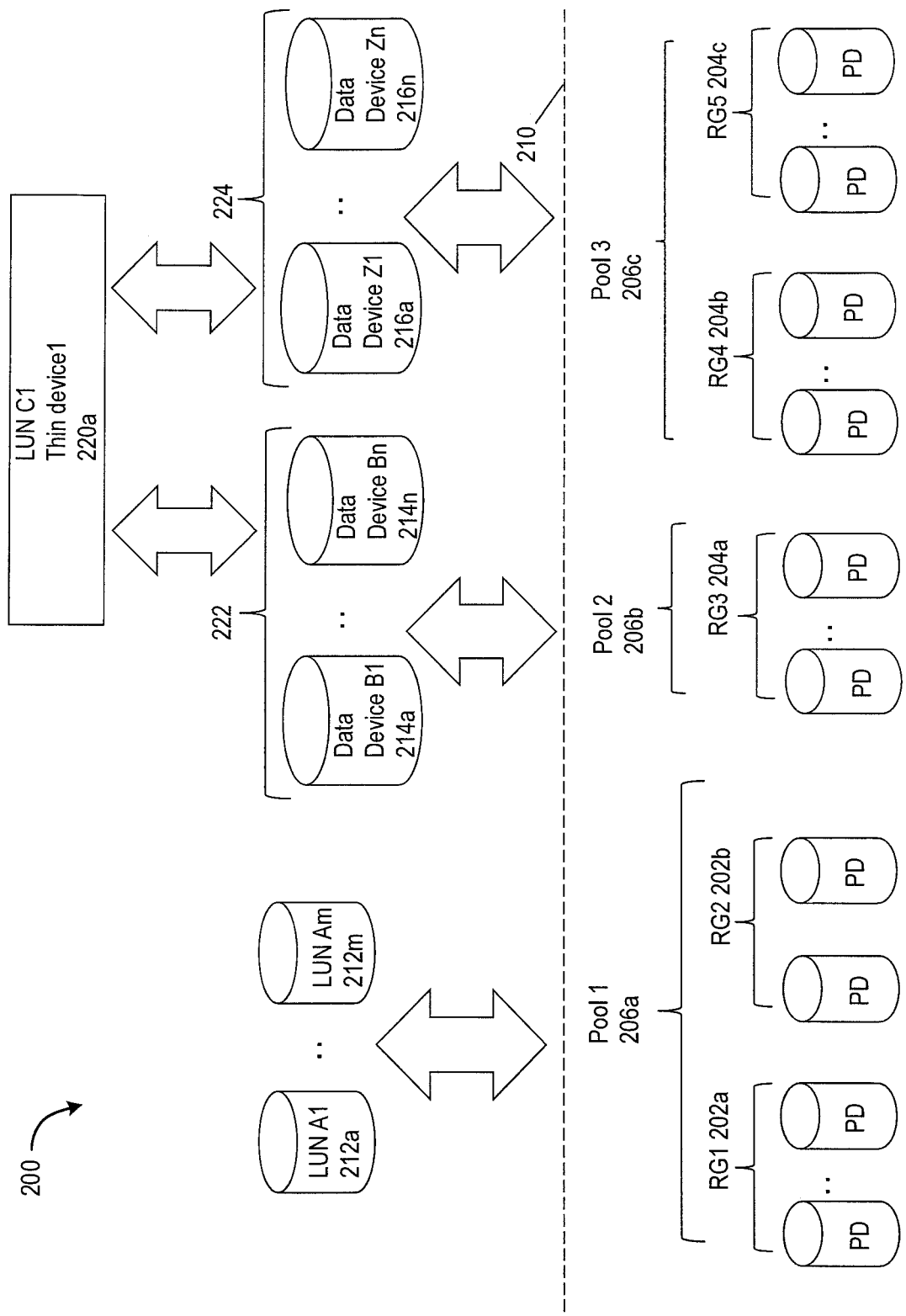
FIG. 2 is an example representation of physical and logical views of entities in connection with storage in an embodiment in accordance with techniques herein.

In a data storage system in an embodiment in accordance with techniques herein, PDs may be configured into a pool or group of physical storage devices where the data storage system may include many such pools of PDs such as illustrated in FIG. 2. Each pool may include one or more configured RAID groups of PDs.

Depending on the particular embodiment, each pool may also include only PDs of the same storage tier with the same type or technology, or may alternatively include PDs of different storage tiers with different types or technologies.

The techniques herein may be generally used in connection with any type of flash device, or more generally, any SSD technology. The flash device may be, for example, a flash device which is a NAND gate flash device, NOR gate flash device, flash device that uses SLC or MLC technology, and the like. In one embodiment, the one or more flash devices may include MLC flash memory devices although an embodiment may utilize MLC, alone or in combination with, other types of flash memory devices or other suitable memory and data storage technologies. More generally, the techniques herein may be used in connection with other SSD technologies although particular flash memory technologies may be described herein for purposes of illustration. For example, consistent with description elsewhere herein, an embodiment may define multiple storage tiers including one tier of PDs based on a first type of flash-based PDs, such as based on SLC technology, and also including another different tier of PDs based on a second type of flash-based PDs, such as MLC. Generally, the SLC PDs may have a higher write endurance and speed than MLC PDs.

With reference to FIG. 2, a first pool, pool 1 206a, may include two RAID groups (RGs) of 10K RPM rotating disk drives of a first storage tier. The foregoing two RGs are denoted as RG1 202a and RG2 202b. A second pool, pool 2 206b, may include 1 RG (denoted RG3 204a) of 15K RPM disk drives of a second storage tier of PDs having a higher relative performance ranking than the first storage tier of 10K RPM drives. A third pool, pool 3 206c, may include 2 RGs (denoted RG 4 204b and RG 5 204c) each of which includes only flash-based drives of a third highest performance storage tier of PDs having a higher relative performance ranking than both the above-noted first storage tier of 10K RPM drives and second storage tier of 15K RPM drives.

The components illustrated in the example 200 below the line 210 may be characterized as providing a physical view of storage in the data storage system and the components illustrated in the example 200 above the line 210 may be characterized as providing a logical view of storage in the data storage system. The pools 206a-c of the physical view of storage may be further configured into one or more logical entities, such as LUNs or more generally, logical devices. For example, LUNs 212a-m may be thick or regular logical devices/LUNs configured or having storage provisioned, from pool 1 206a. LUN 220a may be a virtually provisioned logical device, also referred to as a virtually provisioned LUN, thin device or thin LUN, having physical storage configured from pools 206b and 206c. A thin or virtually provisioned device is described in more detail in following paragraphs and is another type of logical device that may be supported in an embodiment of a data storage system in accordance with techniques herein.

Generally, a data storage system may support one or more different types of logical devices presented as LUNs to clients, such as hosts. For example, a data storage system may provide for configuration of thick or regular LUNs and also virtually provisioned or thin LUNs, as mentioned above. A thick or regular LUN is a logical device that, when configured to have a total usable capacity such as presented to a user for storing data, has all the physical storage provisioned for the total usable capacity. In contrast, a thin or virtually provisioned LUN having a total usable capacity (e.g., a total logical capacity as published or presented to a user) is one where physical storage may be provisioned on demand, for example, as data is written to different portions of the LUN's logical address space. Thus, at any point in time, a thin or virtually provisioned LUN having a total usable capacity may not have an amount of physical storage provisioned for the total usable capacity.

The granularity or the amount of storage provisioned at a time for virtually provisioned LUN may vary with embodiment. In one embodiment, physical storage may be allocated, such as a single allocation unit of storage, the first time there is a write to a particular target logical address (e.g., LUN and location or offset on the LUN). The single allocation unit of physical storage may be larger than the size of the amount of data written and the single allocation unit of physical storage is then mapped to a corresponding portion of the logical address range of a LUN. The corresponding portion of the logical address range includes the target logical address. Thus, at any point in time, not all portions of the logical address space of a virtually provisioned device may be associated or mapped to allocated physical storage depending on which logical addresses of the virtually provisioned LUN have been written to at a point in time.

In one embodiment, a thin device may be implemented as a first logical device, such as 220a, mapped to portions of one or more second logical devices, also referred to as data devices. Each of the data devices may be subsequently mapped to physical storage of underlying storage pools. For example, portions of thin device 220a may be mapped to corresponding portions in one or more data devices of the first group 222 and/or one or more data devices 216a-n of the second group 224. Data devices 214a-n may have physical storage provisioned in a manner like thick or regular LUNs from pool 206b. Data devices 216a-n may have physical storage provisioned in a manner like thick or regular LUNs (e.g., similar to LUNs A1-Am 212a-212m) from pool 206c. Thus, portions of thin device 220a mapped to data devices of 222 have their data stored on 15K RPM PDs of pool 206b, and other portions of thin device 220a mapped to data devices of 224 have their data stored on flash PDs of pool 206c. In this manner, storage for different portions of thin device 220a may be provisioned from multiple storage tiers.

In at least one embodiment as described herein, the particular storage tier upon which a data portion of a thin device is stored may vary with the I/O workload directed to that particular data portion. For example, a first data portion of thin device 220a having a high I/O workload may be stored on a PD of pool 206c by mapping the first logical address of the first data portion in the thin LUN's address space to a second logical address on a data device in 224. In turn the second logical address of the data device in 224 may be mapped to physical storage of pool 206c. A second data portion of thin device 220a having a lower I/O workload than the first data portion may be stored on a PD of pool 206b by mapping the third logical address of the second data portion in the thin LUN's address space to a fourth logical address on a data device in 222. In turn the fourth logical address of the data device in 222 may be mapped to physical storage of pool 206b. As the I/O workload of the foregoing two data portions of thin device 220a may vary, the data portions may be relocated to a different storage tier. For example, if the workload of the second data portion greatly increases at a later point in time, the second data portion may be relocated or moved to pool 206c by mapping its corresponding third logical address in the thin device 220a's address space to a fifth logical address of a data device in 224 where the fifth logical address is mapped to physical storage on pool 206c. The foregoing is described in more detail elsewhere herein.

In some embodiments, the data devices of 222 and 224 may not be directly useable (visible) to hosts coupled to a data storage system. Each of the data devices may correspond to one or more portions (including a whole portion) of one or more of the underlying physical devices. As noted above, the data devices 222 and 224 may be designated as corresponding to different performance classes or storage tiers, so that different ones of the data devices of 222 and 224 correspond to different physical storage having different relative access speeds and/or different RAID protection type (or some other relevant distinguishing characteristic or combination of characteristics), as further discussed elsewhere herein.

Figure 3:
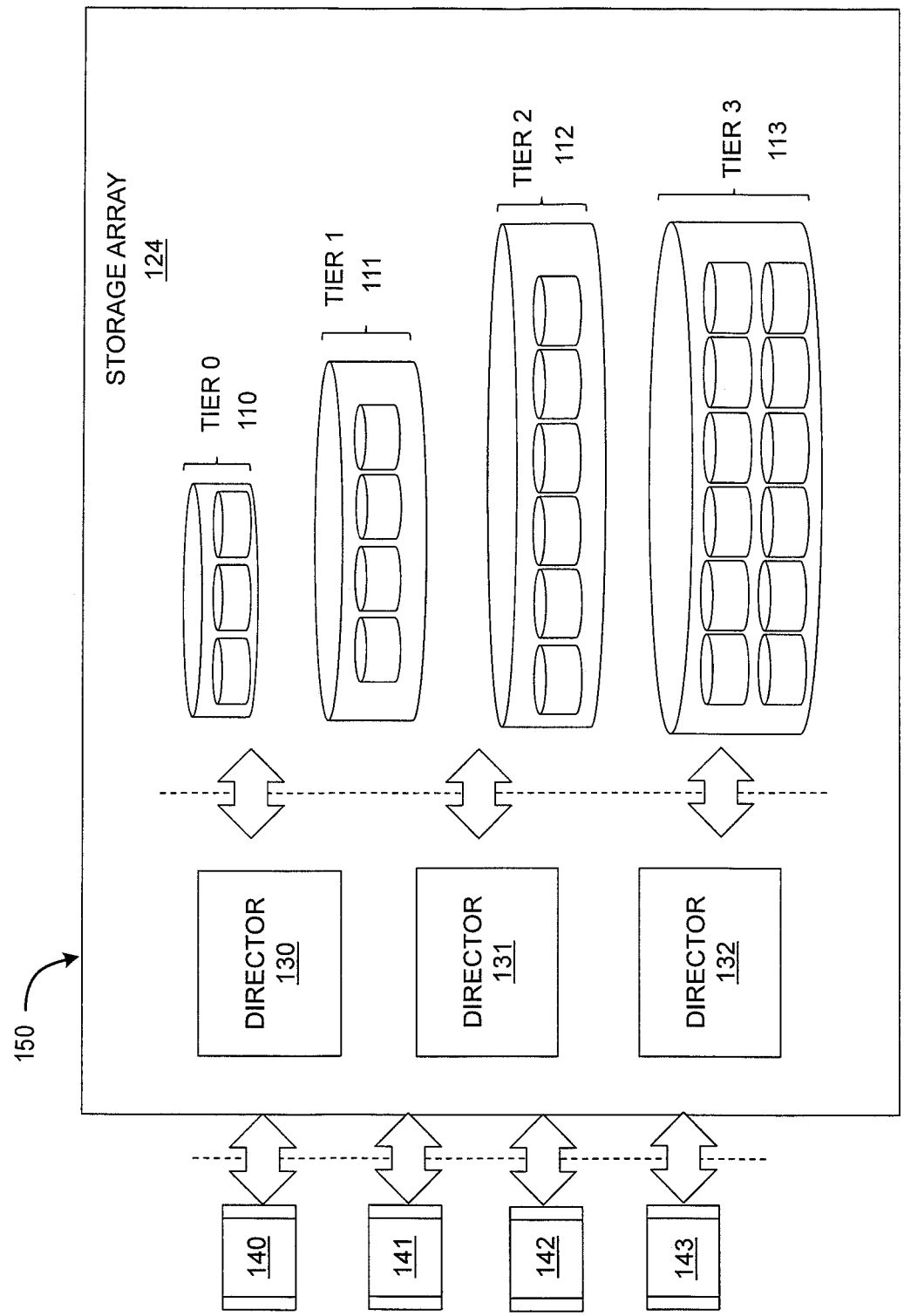
FIG. 3 is an example of tiering components that may be included in a system in accordance with techniques described herein.

FIG. 3 is a schematic illustration showing a storage system 150 that may be used in connection with an embodiment of the system described herein. The storage system 150 may include a storage array 124 having multiple directors 130-132 and multiple storage volumes (LVs, logical devices or VOLUMES 0-3) provided in multiple storage tiers, TIERS 0-3, 110-113. Host applications 140-144 and/or other entities (e.g., other storage devices, SAN switches, etc.) request data writes and data reads to and from the storage array 124 that are facilitated using one or more of the directors 130-132. The storage array 124 may include similar features as that discussed above.

The multiple storage tiers (TIERS 0-3) may have different storage characteristics, such as speed, cost, reliability, availability, security and/or other characteristics. As described above, a tier may represent a set of storage resources, such as physical storage devices, residing in a storage platform. Examples of storage disks that may be used as storage resources within a storage array of a tier may include sets of SATA disks, FC disks and/or EFDs, among other known types of storage devices.

According to various embodiments, each of the tiers 110-113 may be located in different storage tiers. Tiered storage provides that data may be initially allocated to a particular fast tier, but a portion of the data that has not been used over a period of time (for example, three weeks) may be automatically moved to a slower (and perhaps less expensive) tier. For example, data that is expected to be used frequently, for example database indices, may be initially written directly to fast storage whereas data that is not expected to be accessed frequently, for example backup or archived data, may be initially written to slower storage.

In an embodiment, the system described herein may be used in connection with a Fully Automated Storage Tiering for Virtual Pools (FAST VP) VP product produced by EMC Corporation of Hopkinton, Mass., that provides for the optimization of the use of different storage tiers including the ability to easily create and apply tiering policies (e.g., allocation policies, data movement policies including promotion and demotion thresholds, and the like) to transparently automate the control, placement, and movement of data within a storage system based on business needs. For example, different techniques that may be used in connection with the data storage optimizer are described in U.S. patent application Ser. No. 13/466,775, filed May 8, 2012, entitled PERFORMING DATA STORAGE OPTIMIZATIONS ACROSS MULTIPLE DATA STORAGE SYSTEMS, Attorney docket no. EMS-446US/EMC-10-368CIP1, and U.S. patent application Ser. No. 13/929,664, filed Jun. 27, 2013, entitled MANAGING DATA RELOCATION IN STORAGE SYSTEMS, Attorney docket no. EMC-13-0233, both of which are incorporated by reference herein.

Figure 4:
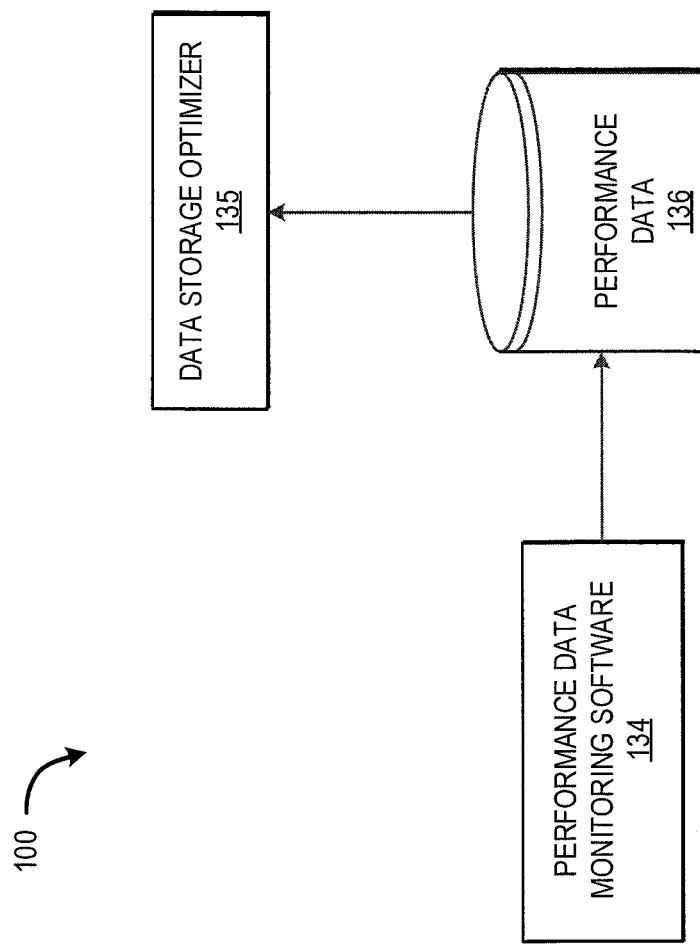
FIG. 4 is an example of components that may be included in a system in accordance with techniques described herein.

Referring to FIG. 4, shown is an example 100 of components that may be used in an embodiment in connection with techniques herein. The example 100 includes performance data monitoring software 134 which gathers performance data about the data storage system. The software 134 may gather and store performance data 136. This performance data 136 may also serve as an input to other software, such as used by the data storage optimizer 135 in connection with performing data storage system optimizations, which attempt to enhance the performance of I/O operations, such as those I/O operations associated with data storage devices 16a-16n of the system 12 (as in FIG. 1). For example, the performance data 136 may be used by a data storage optimizer 135 in an embodiment in accordance with techniques herein. The performance data 136 may be used in determining and/or optimizing one or more statistics or metrics such as may be related to, for example, an I/O workload for one or more physical devices, a pool or group of physical devices, logical devices or volumes (e.g., LUNs), thin or virtually provisioned devices (described in more detail elsewhere herein), portions of thin devices, and the like. The I/O workload may also be a measurement or level of "how busy" a device is, for example, in terms of I/O operations (e.g., I/O throughput such as number of I/Os/second, response time (RT), and the like). Examples of workload information and other information that may be obtained and used in an embodiment in accordance with techniques herein are described in more detail elsewhere herein.

In one embodiment in accordance with techniques herein, components of FIG. 4, such as the performance monitoring software 134, performance data 136 and/or data storage optimizer 135, may be located and execute on a system or processor that is external to the data storage system. As an alternative or in addition to having one or more components execute on a processor, system or component external to the data storage system, one or more of the foregoing components may be located and execute on a processor of the data storage system itself.

The response time for a storage device or volume may be based on a response time associated with the storage device or volume for a period of time. The response time may be based on read and write operations directed to the storage device or volume. Response time represents the amount of time it takes the storage system to complete an I/O request (e.g., a read or write request). Response time may be characterized as including two components: service time and wait time. Service time is the actual amount of time spent servicing or completing an I/O request after receiving the request from a host via an HA 21, or after the storage system 12 generates the I/O request internally. The wait time is the amount of time the I/O request spends waiting in line or queue waiting for service (e.g., prior to executing the I/O operation).

It should be noted that the back-end (e.g., physical device) operations of read and write with respect to a LUN, thin device, and the like, may be viewed as read and write requests or commands from the DA 23, controller or other backend physical device interface. Thus, these are operations may also be characterized as a number of operations with respect to the physical storage device (e.g., number of physical device reads, writes, and the like, based on physical device accesses). This is in contrast to observing or counting a number of particular type of I/O requests (e.g., reads or writes) as issued from the host and received by a front end component such as an HA 21. To illustrate, a host read request may not result in a read request or command issued to the DA if there is a cache hit and the requested data is in cache. The host read request results in a read request or command issued to the DA 23 to retrieve data from the physical drive only if there is a read cache miss. Furthermore, when writing data of a received host I/O request to the physical device, the host write request may result in multiple reads and/or writes by the DA 23 in addition to writing out the host or user data of the request. For example, if the data storage system implements a RAID data protection technique, such as RAID-5, additional reads and writes may be performed such as in connection with writing out additional parity information for the user data. Thus, observed data gathered to determine workload, such as observed numbers of reads and writes (or more generally I/O operations), may refer to the read and write requests or commands performed by the DA. Such read and write commands may correspond, respectively, to physical device accesses such as disk reads and writes that may result from a host I/O request received by an HA 21.

The optimizer 135 may perform processing to determine how to allocate or partition physical storage in a multi-tiered environment for use by multiple applications. The optimizer 135 may also perform other processing such as, for example, to determine what particular portions of LUNs, such as thin devices, to store on physical devices of a particular tier, evaluate when to move data between physical drives of different tiers, and the like. It should be noted that the optimizer 135 may generally represent one or more components that perform processing as described herein as well as one or more other optimizations and other processing that may be performed in an embodiment.

The data storage optimizer in an embodiment in accordance with techniques herein may perform processing to determine what data portions of devices such as thin devices to store on physical devices of a particular tier in a multi-tiered storage environment. Such data portions of a thin device may be automatically placed in a storage tier. The data portions may also be automatically relocated or moved to a different storage tier as the I/O workload and observed performance characteristics for the data portions change over time. In accordance with techniques herein, analysis of I/O workload for data portions of thin devices may be performed in order to determine whether particular data portions should have their data contents stored on physical devices located in a particular storage tier.

Promotion may refer to movement of data from a source storage tier to a target storage tier where the target storage tier is characterized as having devices of higher performance than devices of the source storage tier. For example movement of data from a tier of 7.2K RPM drives to a tier of flash drives may be characterized as a promotion. Demotion may refer generally to movement of data from a source storage tier to a target storage tier where the source storage tier is characterized as having devices of higher performance than devices of the target storage tier. For example movement of data from a tier of flash drives to a tier of 7.2K RPM drives may be characterized as a demotion.

The data storage optimizer in an embodiment in accordance with techniques herein may perform data movement optimizations generally based on any one or more data movement criteria. For example, in a system including 3 storage tiers with tier 1 of flash drives, tier 2 of 15K RPM SAS disk drives and tier 3 of 7.2K RPM NL-SAS disk drives, the criteria may include identifying and placing at least some of the busiest data portions having the highest I/O workload on the highest performance storage tier, such as tier 1—the flash-based tier—in the multi-tiered storage system. The data movement criteria may include identifying and placing at least some of the coldest/most inactive data portions having the lowest I/O workload on the lowest or lower performance storage tier(s), such as any of tiers 2 and tier 3.

As another example, the data movement criteria may include maintaining or meeting specified service level objectives (SLOs). An SLO may define one or more performance criteria or goals to be met with respect to a set of one or more LUNs where the set of LUNs may be associated, for example, with an application, a customer, a host or other client, and the like. For example, an SLO may specify that the average I/O RT (such as measured from the front end or HA of the data storage system) should be less than 5 milliseconds (ms). Accordingly, the data storage optimizer may perform one or more data movements for a particular LUN of the set depending on whether the SLO for the set of LUNs is currently met. For example, if the average observed I/O RT for the set of one or more LUNs is 6 ms, the data storage optimizer may perform one or more data movements to relocate data portion(s) of any of the LUNs, such as currently located in tier 3, to a higher performance storage tier, such as tier 1.

Data portions of a LUN may be initially placed or located in a storage tier based on an initial placement or allocation policy. Subsequently, as data operations are performed with respect to the different data portions and I/O workload data collected, data portions may be automatically relocated or placed in different storage tiers having different performance characteristics as the observed I/O workload or activity of the data portions change over time. In such an embodiment using the data storage optimizer, it may be beneficial to identify which data portions currently are hot (active or having high I/O workload or high level of I/O activity) and which data portions are cold (inactive or idle with respect to I/O workload or activity). Identifying hot data portions may be useful, for example, to determine data movement candidates to be relocated to another storage tier. For example, if trying to improve performance because SLO is violated, it may be desirable to relocate or move a hot data portion of a LUN currently stored on a low performance tier to a higher performance tier to increase overall performance for the LUN.

An embodiment may use a data storage optimizer such as, for example, EMC® Fully Automated Storage and Tiering for Virtual Pools (FAST VP) by EMC Corporation, providing functionality as described herein for such automated evaluation and data movement optimizations. For example, different techniques that may be used in connection with the data storage optimizer are described in U.S. patent application Ser. No. 13/466,775, filed May 8, 2012, PERFORMING DATA STORAGE OPTIMIZATIONS ACROSS MULTIPLE DATA STORAGE SYSTEMS, Attorney docket no. EMS-446US/EMC-10-368CIP1, which is incorporated by reference herein.

In at least one embodiment in accordance with techniques herein, one or more I/O statistics may be observed and collected for individual partitions, or slices of each LUN, such as each thin or virtually provisioned LUN. The logical address space of each LUN may be divided into partitions each of which corresponds to a subrange of the LUN's logical address space. Thus, I/O statistics may be maintained for individual partitions or slices of each LUN where each such partition or slice is of a particular size and maps to a corresponding subrange of the LUN's logical address space.

An embodiment may have different size granularities or units. For example, consider a case for a thin LUN having a first logical address space where I/O statistics may be maintained for a first slice having a corresponding logical address subrange of the first logical address space.

The embodiment may allocate physical storage for thin LUNs in allocation units referred to as chunks. In some cases, there may be multiple chunks in a single slice (e.g., where each chunk may be less than the size of a slice for which I/O statistics are maintained). Thus, the entire corresponding logical address subrange of the first slice may not be mapped to allocated physical storage depending on what logical addresses of the thin LUN have been written to. Additionally, the embodiment may perform data movement or relocation optimizations based on a data movement size granularity. In at least one embodiment, the data movement size granularity or unit may be the same as the size of a slice for which I/O statistics are maintained and collected.

Conventional systems typically use a fixed size slice for each LUN's logical address space. For example, the size of each slice may be 256 megabytes (MB) thereby denoting that I/O statistics are collected for each 256 MB portion of logical address space and where data movement optimizations are performed which relocate or move data portions which are 256 MB in size. As the storage capacity in a storage environment increases, so does the number of data slices for which I/O workload statistics are collected for use with data storage optimizations as described above. Thus, having such a large number of sets of I/O statistics to be collected and analyzed for which data movement candidates are proposed by the data storage optimizer may present scalability challenges by requiring use of additional data storage system resources (e.g., memory, computational time) to accordingly scale up with increased storage capacity.

Additionally, using a fixed or same slice size for all LUNs in the data storage system where I/O statistics are collected per slice and where data movements relocate slice size data portions may present an additional problem. It may be, for example, that not all the data within the single slice has the same I/O workload. For example, only a very small piece of the data slice may actually be active or hot with the remaining data of the slice being cold or relatively inactive. In such a case where I/O statistics are collected per slice, it is not possible to determine which subportions of the single slice are active and should be promoted or inactive and demoted. Furthermore, relocating the entire slice of data to a highest performance tier, such as flash-based tier, may be an inefficient use of the most expensive (cost/GB) storage tier in the system when only a fraction of the data slice is "hot" (very high I/O workload) with remaining slice data inactive or idle. It may be desirable to provide for a finer granularity of I/O statistics collection and a finer granularity of data movement in such cases. However, as the size of the data portion for which I/O statistics gets smaller, the total number of sets of I/O statistics further increases and places in further increased demands on system resources.

As described in following paragraphs, techniques herein provide for an adjustable slice size for which I/O statistics denoting I/O workload are collected. Such techniques provide for using various slice sizes for different slices of a logical address space. Such techniques may provide a finer slice granularity for data portions and logical address space subranges having higher I/O workloads whereby the slice size may further decrease as the associated I/O workload increases. In a similar manner, techniques herein provide for increasing the size of a slice as the associated I/O workload decreases. Techniques described in following paragraphs are scalable and dynamically modify slice sizes associated with different logical address space portions as associated I/O workload changes over time. In such an embodiment in accordance with techniques herein, data movements may be performed that relocate data portions of particular sizes equal to current adjustable slice sizes. In at least one embodiment, the adjustable slice sizes are used to define sizes of data portions/logical address space portions for which I/O statistics are collected and for which data movements are performed. The data movement granularity size is adjustable and varied and is equal to whatever the current adjustable slice values are at a point in time.

As described in more detail below, an adjustable slice size is used to track and calculate slice "temperature" denoting the I/O workload directed to a slice. The temperature may be more generally characterized by determining one or more I/O metrics or statistics related to I/O activity. In a typical data storage system, there may be a large portion of data which is inactive (cold). For this inactive data, techniques may be used herein to simplify management by treating the entire large data portion as a single slice. Meanwhile, there may be a small portion of busy highly accessed (hot) data for which a finer granularity of slice size may be used to improve efficiency of data movement optimizations and use of the different storage tiers. Using adjustable slice size allows an embodiment of a data storage optimizer to easily scale upwards with larger storage capacity while also handling smaller data portions if needed to increase accuracy and efficiency associated with data movement relocation and analysis.

In one embodiment, the various slice sizes may be determined based on the average temperature, I/O activity, or I/O workload per unit of storage. For example, in one embodiment, the I/O statistic used to measure the average temperature, I/O activity or I/O workload may be expressed in I/Os per second (IOPS). It should be noted that more generally, any suitable I/O statistic may be used. Additionally, in one embodiment, I/O workload may be expressed as a normalized I/O workload or as an I/O workload density where the unit of storage (denoting a logical address space portion) may be 1 GB although more generally, any suitable unit of storage may be used. Thus, based on the foregoing, an embodiment may determine the various slice sizes based on the average number of IOPS/GB for a particular logical address space portion. More generally, the average number of IOPS/GB represents the average I/O workload density per GB of storage as may be used in an embodiment in accordance with techniques herein as used in following examples.

In one embodiment, processing may initially begin with a starting slice size, such as 256 GB, used for all slices. Periodically, processing as described in following paragraphs may be performed to determine whether to adjust the size of any existing slice where such size adjustment may be to either further partition a single slice into multiple smaller slices, or whether to merge two or more adjacent slices (e.g., having logical address spaces which are adjacent or contiguous with one another). The foregoing and other processing is described in more detail below.

Figure 5:
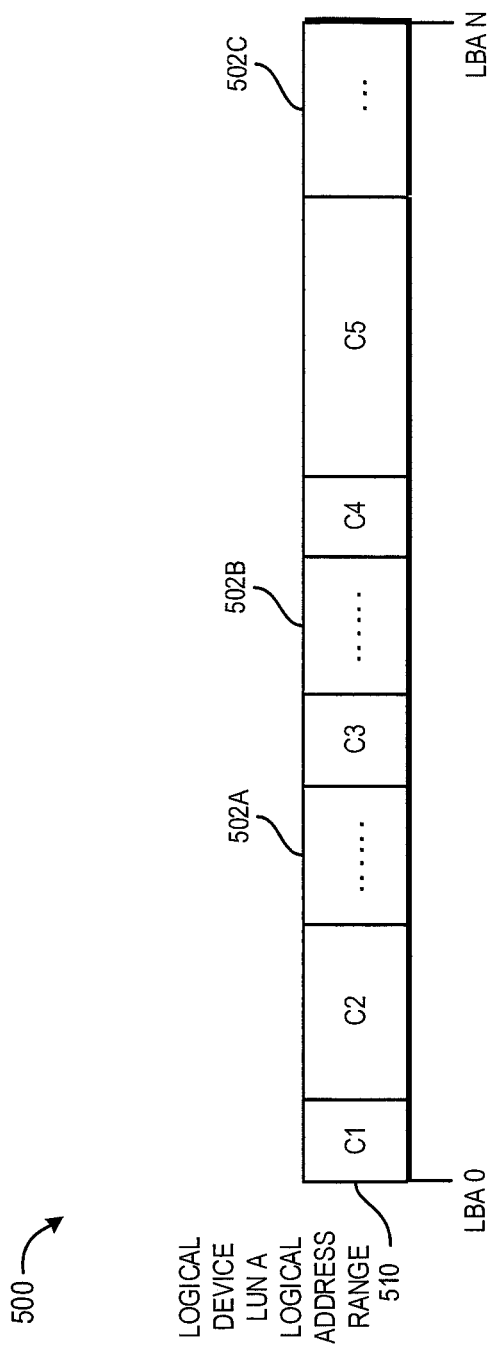
FIG. 5 is an example illustrating partitioning of a logical address space into slices of various sizes and tiering components in an embodiment in accordance with techniques herein.

Referring to FIG. 5, shown is an example illustrating different slice sizes that may be associated with a logical address space of a LUN, such as a thin LUN, in an embodiment in accordance with techniques herein. The example 500 includes element 510 denoting the entire logical address space range (from LBA 0 though N) for thin LUN A. C1-C5 may denote slices of different sizes each mapping to a portion or subrange of the logical address space of thin LUN A. Additionally, in this example, elements 502a-c denote portions (e.g., one or more other slices) of LUN A's logical address space which are not mapped to any physical storage and thus have no associated I/O workload or activity. As described in more detail below, each slice has a relative size that varies with the current average I/O workload/GB wherein, in one embodiment, the I/O workload or I/O activity may be expressed as IOPS. The example 500 is a snapshot representing the current values for the adjustable slice sizes used with LUN A at a first point in time. For example, the 5 slices C1-C5, may be ranked, from highest to lowest in terms of average IOPS/GB, as follows: C4, C1, C3, C2, C5. The example 500 may represent the slice sizes at the first point in time for thin LUN A after performing processing for several elapsed time periods during which I/O workload information was observed for LUN A and then used to determine whether to adjust slice sizes.

Based on the current values of average IOPS/GB for the slices C1-C5, current slice sizes for C1-C5 may be further dynamically adjusted, if needed. Slice size may be dynamically adjusted either by splitting the single slice into multiple slices each of a smaller size to further identify one or more "hot spots" (areas of high I/O workload or activity) within the slice, or by merging together adjacent relatively cold slices into one larger slice. Such merging may merge together two or more existing slices which have contiguous LBA ranges (e.g., collectively form a single contiguous logical address portion of the LUN's address space). To further illustrate, the size of a slice, such as C3, may be dynamically adjusted by further partitioning the slice C3 into multiple slices each of a smaller size if the current observed average IOPS/GB for the slice C3 has a particularly high average IOPS/GB. Whether the current observed average IOPS/GB is sufficiently high enough (e.g., sufficiently hot or active enough) to warrant further partitioning into multiple slices may be made by qualifying or validating slice C3 for partitioning or splitting into multiple slices. Such qualifying may utilize the observed average IOPS/GB for C3. For example, whether the current observed average IOPS/GB for C3 is sufficiently high enough (e.g., sufficiently hot or active enough) to warrant further partitioning into multiple slices may be made by comparing the current slice size of C3 to a predetermined slice size based on the observed average IOPS/GB for C3. If the predetermined slice size is smaller than the current slice size, processing may be performed to partition C3 into multiple smaller size slices.

Two or more slices having adjacent or contiguous logical address portions for LUN A, such as C4 and C5, may be merged or combined into a single larger slice if both slices C4 and C5 each have a current observed average IOPS/GB that is sufficiently low enough (e.g., sufficiently cold or inactive) to warrant merging. Whether the current observed average IOPS/GB for each of two or more slices is sufficiently low enough to warrant merging into a single slice may be made by qualifying or validating for merging each of C4 and C5, and also validating or qualifying for merging the combined slice that would result from merging C4 and C5. Such qualifying or validating may use the observed average IOPS/GB for each existing slice C4 and C5 and the average IOPS/GB for the combined slice. For example, whether the current observed average IOPS/GB for each of C4 and C5 is sufficiently low enough (e.g., sufficiently cold or inactive enough) to warrant merging into a single slice may be made by comparing the current slice size of C4 to a predetermined slice size based on the observed average IOPS/GB for C4. A similar determination may be made for C5. For both of C4 and C5, if the predetermined slice size is larger than the current slice size, processing may be performed to merge C4 and C5.

The observed average IOPS/GB statistic may be calculated for each slice C1-05 based on the logical address space portion associated with each slice. For example, assume C1 represents an 8 GB portion of LUN A's logical address space. For a time period during which I/O workload data is collected, the total number of I/Os directed to the 8 GB logical address space portion of LUN A are determined and an I/O rate (e.g., the total number of I/Os per second=IOPS) is determined. For example, assume C1 has an observed I/O rate or IOPS of 200 I/Os per second (200 IOPS). The foregoing I/O rate of 200 IOPS is then further divided by 8 GB where an observed average of 25 IOPS/GB is determined. In a similar manner, average IOPS/GB may be calculated for any combined slice resulting from merging two or more slices into the combined slice.

In an embodiment in accordance with techniques herein, I/O workload information may be collected as just described at each occurrence of a fixed time period. At the end of the time period that has elapsed, processing may be performed to evaluate slices and determine whether to merge or further partition existing slices. For a first time period, a first set of slices are analyzed to determine whether to further partition or merge any slices of the first set thereby resulting in a second set of slices for which I/O workload information is collected in the next second period. At the end of the second period, the second set of slices are analyzed in manner to determine whether to further partition or merge any slices of the second set thereby resulting in a third set of slices for which I/O workload information is collected in the next third period. The foregoing may be similarly repeated each time period.

In one embodiment, a table of predefined or established temperature-slice size relationships may be used in processing described in following paragraphs to determine a particular slice size for an observed temperature associated with a slice. In this example, the temperature may be the average I/O workload/GB expressed as IOPS/GB as observed for a slice based on collected I/O workload or activity information for a time period.

Figure 6:
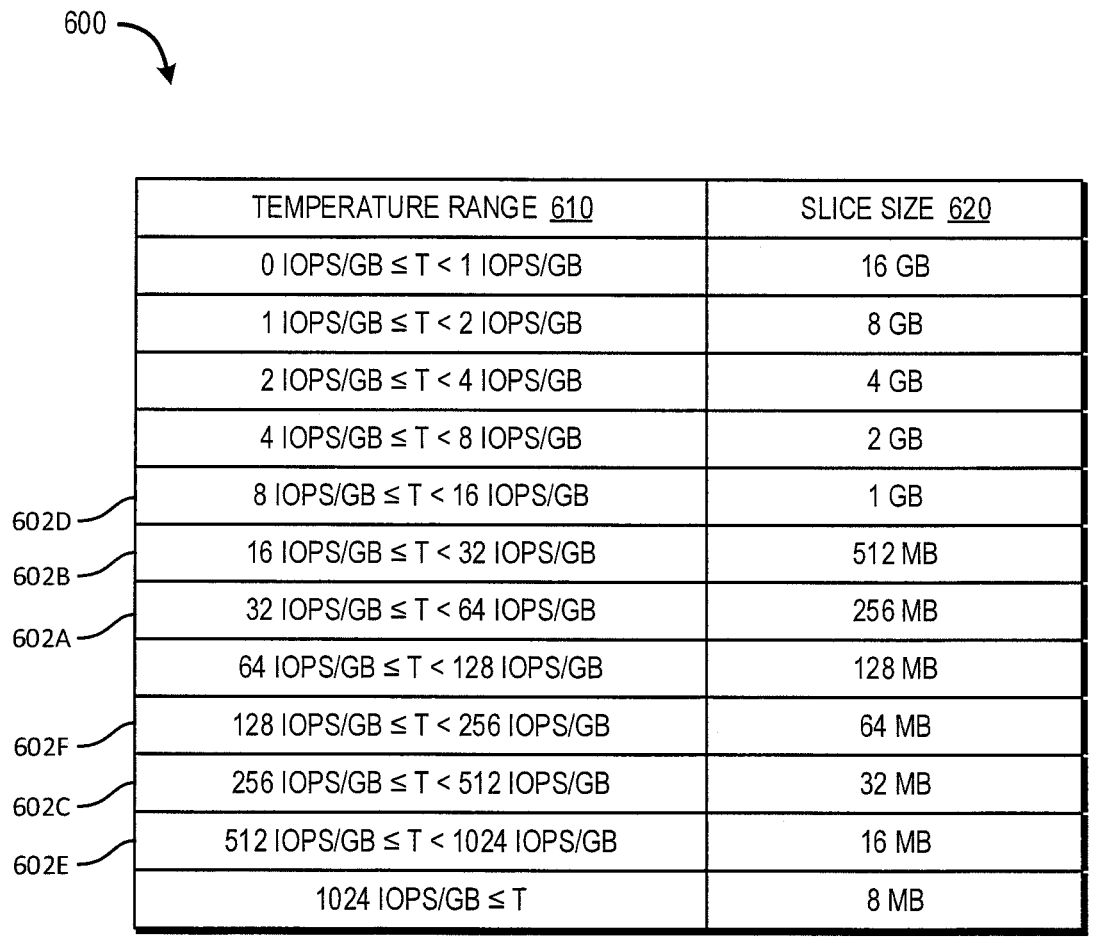
FIG. 6 is an example illustrating data and software components that may be used in an embodiment in accordance with techniques herein.

Referring to FIG. 6, shown is an example of a table of temperature-slice size relationships that may be used in an embodiment in accordance with techniques herein. The table 600 includes a column 610 of temperature ranges and column 620 includes predetermined or specified slice sizes. Each row of the table denotes a predetermined or specified slice size applicable when the observed temperature T, which is the observed average IOPS/GB in this example, falls with the particular predetermined temperature range in column 610 of the row. It should be noted that the table 600 includes a particular set of slice sizes in column 620 ranging from a maximum slice size of 16 GB to a smallest or minimum slice size of 8 MB. Generally, an embodiment may select a suitable number of slice sizes spanning an suitable slice size range. Additionally, the mapping of a particular temperature range in 610 to a particular slice size in 620 may vary with embodiment and is not limited to that as illustrating in FIG. 6 for purposes of illustration.

To further illustrate, row 602A indicates that a first slice should have a slice size of 256 MB if the first slice has an observed average I/O workload/GB, denoted as T, where 32 IOPS/GB≤T<64 IOPS/GB for the time period for the first slice. Consider further an example where the first slice has an observed average I/O workload/GB of 62 IOPS/GB, then row 602A indicates the first slice should have a slice size of 256 MB. If the first slice currently has a slice size that is larger than the predetermined slice size 256 MB (as denoted by row 602A), processing may be performed to further partition the first slice into multiple smaller slices. For example, if the first slice currently has a slice size of 1024 MB=1 GB (which is larger than the specified slice size of 256 MB in the table entry 602A based on I/O workload or activity of 62 IOPS/GB for the current time period), the first slice of 1 GB may be partitioned into 4 smaller slices each of 256 MB based on the specified or predetermined slice size indicated in the applicable table entry. It should be noted that generally, the existing single slice may be partitioned into multiple slices each having a size that is less than current size of the single existing slice. In one embodiment, the smaller slices resulting from the partitioning may have sizes selected from a set of predetermined sizes, such as based on predetermined slice sizes in column 620 of FIG. 6 (e.g., sizes may be equal to one of the predetermined slice sizes in column 620).

Thus, generally, a determination may be made as to whether any adjustment is needed to a slice of a current slice size by determining whether the current slice size and current IOPS/GB maps to an entry in the table where the entry includes a predetermined slice size matching the current size and also where the current IOPS/GB falls within the entry's predetermined temperature range. If so, then no adjustment to the slice size is needed (e.g. neither splitting nor merging processing is performed). For example, a current slice having a slice size of 1 GB with an observed average I/O workload/GB=9 IOPS/GB maps properly to a matching entry 602D whereby the current 9 IOPS/GB matches or falls within the predetermined temperature range in column 610 for entry 602D and whereby the current slice size of 1 GB matches the predetermined slice size in column 620 for entry 602D.

However, consider the case where there is no such matching entry in the table 600 matching both the current slice size and current IOPS/GB of the slice. Consider first determining whether to split or partition the slice into multiple smaller slices with the example above for the slice having a current size of 1 GB and current I/O workload of 62 IOPS/GB. Such determination may be made in accordance with one or more partitioning criteria. Such criteria may include performing processing to validate or qualify the slice as a slice for which slice splitting or partitioning should be performed. This is described below in more detail in connection with an example. An entry or row in the table 600 may be located where the current 62 IOPS/GB falls within the predetermined temperature range in column 610. In this case, the row 602A is matched. For the current I/O workload of 62 IOPS/GB, entry 602A indicates the predetermined slice size should be 256 MB. The current slice size of 1 GB is larger than the predetermined slice size of 256 MB, so processing may be performed to split the slice into one or more smaller slices each having an associated I/O workload in IOPS/GB and associated slice size matching an entry in the table. Thus, the slice may be partitioned into 4 slices of 256 MB each. As an alternative to, or in addition to the foregoing, in connection with determining whether to split a slice, an entry in the table may be located where the current slice size matches a predetermined slice size in column 620. Consider the example above for the slice having a current size of 1 GB and current I/O workload of 62 IOPS/GB. A row in table 600 may be located where the current slice size of 1 GB matches a predetermined slice size in column 620. In this case, row 602D is matched. For the current slice size of 1 GB, entry 602D indicates in column 610 that the predetermined I/O workload T should meet the following: 8 IOPS/GB≤T<16 IOPS/GB. The current I/O workload of 62 IOPS/GB is higher than the specified temperature range and therefore the slice should be split. As described above, processing may be performed to split the slice into one or more smaller slices each having an associated I/O workload in IOPS/GB and slice size matching an entry in the table. Thus, the slice may be partitioned into 4 slices of 256 MB each.

The foregoing illustrates an example of partitioning criteria that includes qualifying or validating the slice for partitioning, where qualifying or validating the slice for partitioning may include determining that the 62 IOPS/GB observed for the slice maps to a first predetermined slice size (256 MB) that is smaller than the current slice size of 1 GB. Furthermore, qualifying or validating the slice for partitioning may include determining that the current slice size of 1 GB maps to a first predetermined workload range (as in column 610 of entry 602D) and the 62 IOPS/GB observed for the slice exceeds the first predetermined workload range.

Figure 7:
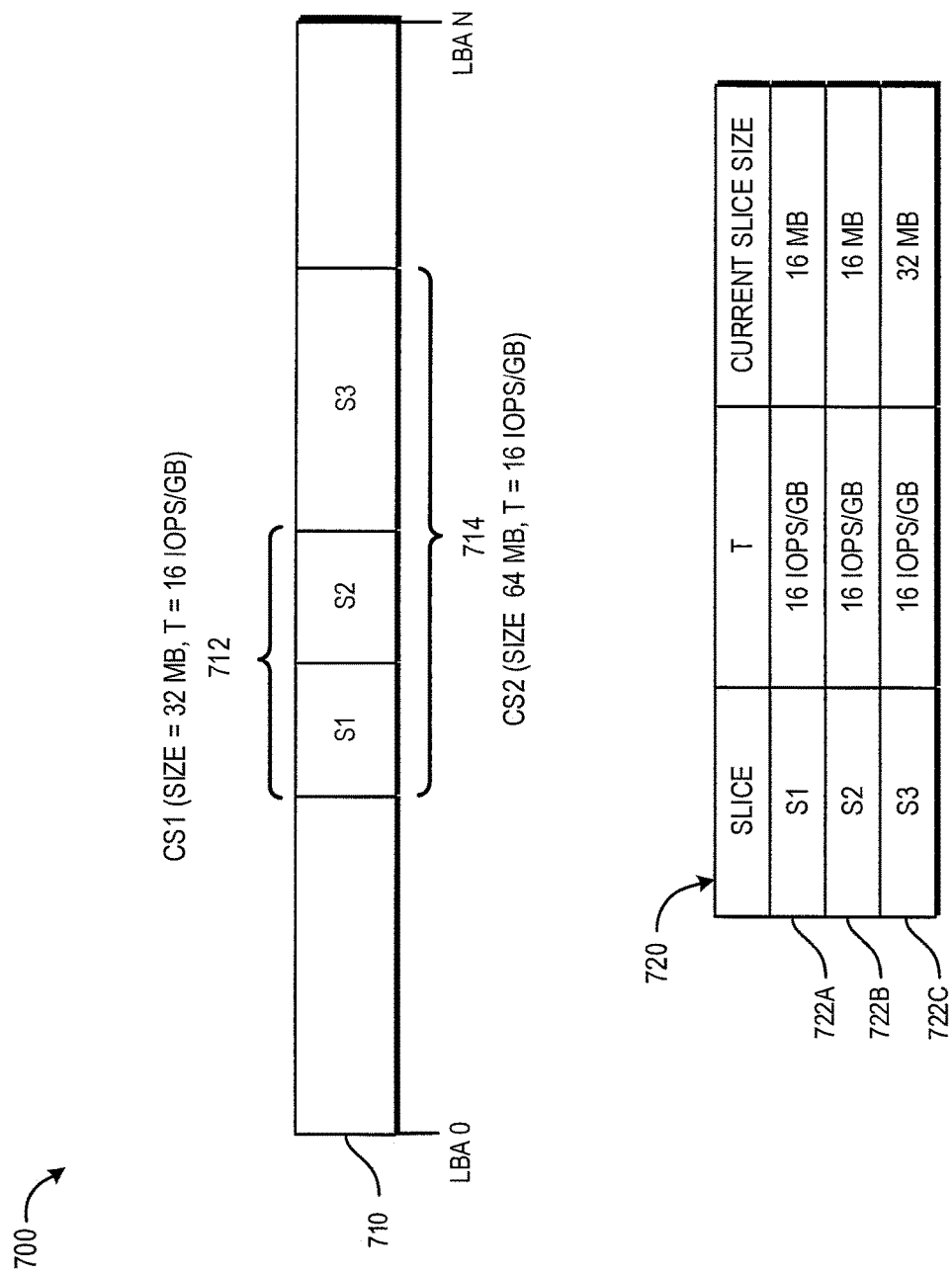
FIG. 7 is an example illustrating partitioning of a logical address space into slices of various sizes in an embodiment in accordance with techniques herein.

In a similar manner, the table of FIG. 6 may be used to determine whether to merge two slices which are logically adjacent having adjacent logical address space portions for the LUN. For example, reference is made to the example 700 of FIG. 7. In FIG. 7, element 710 may represent the logical address range of a thin LUN and S1, S2 and S3 may denote 3 adjacent slices which collectively have a combined logical address space that is contiguous.

Element 720 may represent a table of T values denoting observed average I/O workload (IOPS)/GB values for a time period. As indicated by row 722A, the first slice S1 may have a current slice size of 16 MB and an observed average I/O workload/GB=16 IOPS/GB. As indicated by row 722B, the second slice S2 adjacent to the first slice S1 may also have a current slice size of 16 MB and an observed average I/O workload/GB=16 IOPS/GB. Slices S1 and S2 are adjacent and each has a logical address space portion that, when combined, form a single contiguous logical address space portion for the LUN.

Processing may be performed to determine whether to merge or combine S1 and S2 into a single slice in accordance with one or more merge criteria that includes qualifying or validating both S1 and S2 individually and then also qualifying or validating the combined slice of S1 and S2 as would result if the proposed slice candidates S1 and S2 are combined. For each of the slices S1 and S2 having current T values as denoted in rows 722A-B of 720, entry 602B of table 600 of FIG. 6 may be identified where the entry identifies a range in column 610 which includes each slice's T value of 16 IOPS/GB. Based on entry 602B of the table 600 from FIG. 6, for the particular values of T (current observed average I/O workload of 16 IOPS/GB) for each of the foregoing slices S1 and S2, each such slice should have a much larger slice size of 512 MB rather than the current slice size of 16 MB.

Accordingly, processing in an embodiment in accordance with techniques herein may determine that the foregoing slices S1 and S2 should be merged or combined since both slices have a current slice size that is less than the specified or predetermined slice size as indicated in the table 600. Furthermore, combining the first and second slices results in a single combined slice having a combined value of T=16 IOPS/GB (denoting the combined slice's average IOPS/GB based on the two T values 16 IOPS/GB for S1 and S2 in 722A and 722B) and a combined slice size of 32 MB. For the combined slice's value of T=16 IOPS/GB, the combined slice size of 32 MB also does not exceed the specified slice size of 512 MB of the table entry 602B. Put another way, the combined slice has a size of 32 MB which, based on entry 602C of the table, should have a corresponding current value of T, where 256 IOPS/GB≤T<512 IOPS/GB. However, the current value of T for the combined slice is only 16 IOPS/GB (e.g., does not exceed the foregoing temperature range <512 IOPS/GB).

Thus, two slices may be merged based on merge criteria that includes determining that each of the two slices has a current T (denoting the slice's observed average IOPS/GB) and a current slice size where the current slice size is less than a predetermined or specified slice size of the table row 602B for the current T. Put another way, each of the two slices S1 and S2 has a slice size of 16 MB matching a predetermined slice size in column 620 of entry 602E of table 600. Entry 602E includes an associated predetermined temperature range in column 610: 512 IOPS/GB≤T<1024 IOPS/GB, and the current T=16 IOPS/GB for each slice is less than this range and may therefore be merged.

In this way, the merge criteria includes qualifying or validating the slice for merging, and wherein qualifying/validating the slice S1 for merging includes determining that the S1's current T=16 IOPS/GB maps to a first predetermined slice size of 512 MB in column 620 of entry 602B that is larger than the S1's current slice size=16 MB. Qualifying or validating the slice S1 for merging may include determining that S1's current slice size of 16 MB maps to a first predetermined workload range in column 610 of entry 602E and S1's current T=16 IOPS/G does not exceed the first predetermined workload range. In a similar manner, the merge criteria includes similarly qualifying or validating the second slice S2, the proposed candidate slice to be merged with S1.

Additionally, the merge criteria may also include qualifying or validating the resulting combined slice (resulting from combining S1 and S2). Qualifying or validating the resulting combined slice may include determining that the resulting size of the combined two slices does not exceed the specified slice size of row 602B based on a combined value of T determined for the combined slice. For example, the combined slice has a T value=16 IOPS/GB and a slice size of 32 MB. Merge criteria may include ensuring that, given the current T for the combined slice, the combined slice's size (e.g., 32 MB) does not exceed a predetermined size (e.g., 512 MB) specified for the current T (e.g., 16 IOPS/GB) of the combined slice. Put another way, entry 602C in table 600 may be selected which has a predetermined slice size 32 MB in column 620 that matches the slice size 32 MB of the combined slice. Merge criteria may include ensuring that the resulting combined slice's T of 16 IOPS/GB does not exceed the predetermined range in column 610 of entry 602E (e.g., 16 IOPS/GB is less than 1024 IOPS/GB).

Thus, the merge criteria includes qualifying or validating the combined slice of S1 and S2 where qualifying or validating the combined slice includes determining that the resulting combined slice's T=16 IOPS/GB is included in the predetermined temperature range of column 610 of entry 602B which maps to a predetermined slice size of 512 MB in column 620 of entry 602B where the combined slice's size of 32 MB does not exceed the predetermined size of 512 MB. Qualifying or validating the combined slice may include determining that the combined slice's size of 32 MB size maps to a predetermined workload range in column 610 of entry 602C and the combined slice T=16 IOPS/MB does not exceed the predetermined workload range (e.g., 256 IOPS/GB≤T<512 IOPS/GB).

At this point S1 and S2 may be merged into a first combined slice CS1 as denoted by 612 having a combined slice size of 32 MB and a T value=16 IOPS/GB for CS1. Processing may further continue to determine whether there is any other adjacent slice is a candidate that may possibly be merged with CS1. In this case, as indicated by row 722C, slice S3 is another slice and processing similar to that as just described above with respect to S1 and S2 may now be performed with respect to CS1 and S3 to determine whether to merge CS1 and S3. In this example, processing in accordance with the merge criteria may determine that S3 is adjacent to CS1, CS1 has a current slice size of 32 MB that is less than a predetermined slice size of 512 MB (denoted by table entry 602B selected for the current T=16 IOPS for CS1), and S3 has a current slice size of 32 MB that is less than a predetermined slice size of 512 MB (denoted by table entry 602B selected for the current T=16 IOPS for S3). Additionally, the second combined sliced CS2 614 (denoting the result of combining CS1 and S3) has a slice size of 64 MB which does not exceed the predetermined size of 512 MB denoted by table entry 602B selected for the current T of CS2=16 IOPS. Put another way, entry 602F of table 600 may be determined having a predetermined slice size in column 620 matching the slice size of 64 MB for the combined slice CS2. The current T for CS2=16 IOPS does not exceed the associated predetermined temperature range in column 610 of entry 602F and thus slice S3 may be further combined with CS2.

In this example, there are no further slices adjacent to combine with slice CS2 614 so merge processing in connection with CS2 may stop. However, if there were one or more other slices further adjacent to S1 or S3, merge processing may be performed in a similar manner as described above to determine, based on the merge criteria, whether to merge any other adjacent slice. Generally, such merge processing may continue until any one of the specified merge criteria is no longer met. For example, merge processing may stop with respect to a current slice if there are no further adjacent slices to consider for merging/combing. Merge processing may not validate an adjacent slice for merging with a slice if an adjacent slice has a current IOPS/GB and current slice size where both the current IOPS/GB and current slice size match an entry in the table 600. Merge processing may stop with respect to a current slice based on a resulting combined slice (that would be formed as a result of combining the current slice with another adjacent slice). For example, assume the resulting combined slice has an associated slice size that does not need further adjustment (e.g., if the current slice size and current IOPS/GB of the combined slice maps to an entry in the table 600 where the entry includes a predetermined slice size matching the current slice size and also where the current IOPS/GB of the combined slice falls within the entry's predetermined temperature range). If so, then no further adjustment to the combined slice size is needed (e.g. neither splitting nor merging processing is performed). In such a case, the merge proposed by the resulting combined slice may be performed and not further combined with any other adjacent slices.

As another example, merge processing may determine not to perform a proposed merge to generate a resulting combined slice based on the resulting combined slice. For example, assume a resulting combined slice has a slice size X and a resulting T value (e.g. denoting resulting IOPS/GB for the combined slice). An entry in the table may be located where the entry's predetermined slice size in column 620 matches X. The proposed merge may not be performed if the resulting T value for the combined slice is higher than the entry's predetermined temperature range in column 610. Put another way, an entry in the table may be located where the entry's predetermined temperature range in column 610 includes the resulting T value for the combined slice. The proposed merge may not be performed if the combined slice's size X exceeds the predetermined slice size in column 620. Thus, generally, merging may continue to generate a larger combined slice having a resulting size until the associated IOPS/GB of the combined slice exceeds the predetermined temperature range in the table 600 specified for the resulting size.

It should be noted that embodiment may use any other suitable criteria. For example, an embodiment may limit the number of slices that can merged. For example, an embodiment may specify a maximum number of slices that can be merged into a single slice at a point in time (for single collection or time period).

Thus, an embodiment in accordance with techniques herein may have slices with various slice sizes. By combining slices into a larger combined slice, the total number of slices may be reduced. A slice may be split into smaller size slices so that a "hot" data portion may be identified and relocated accordingly. For example, processing may be performed to only move the hot data portion to higher/highest storage tier. An embodiment in accordance with techniques herein may also perform processing to exclude particular slices from analysis. For example, idle slices or slices having an associated I/O workload/GB less than a specified threshold may be excluded from analysis and processing by considering such slices as properly located. Excluding such slices allows just a subset of data to be considered in processing described herein.

What will now be described in connection with flowcharts of processing steps that may be performed in an embodiment in accordance with techniques herein which summarize processing described above.

Figure 8:
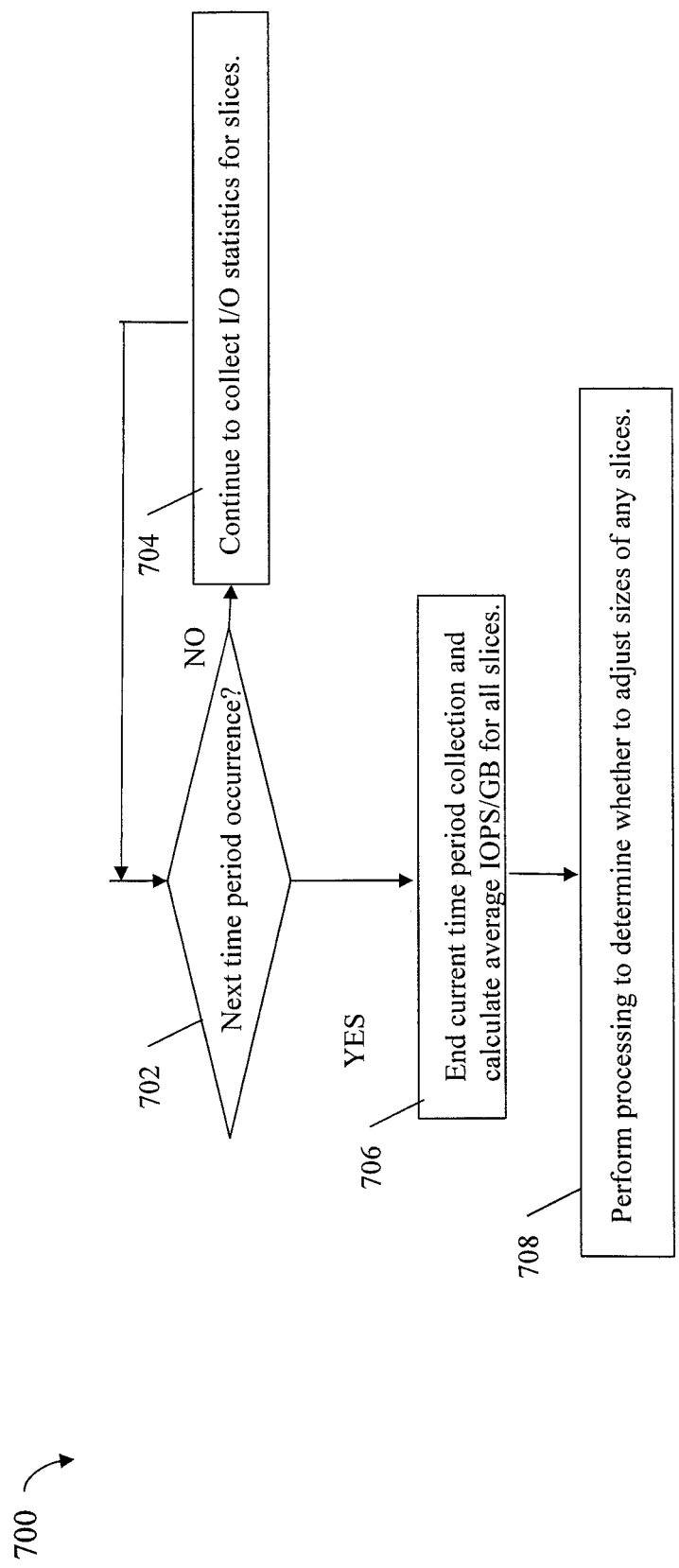
FIGS. 8 and 9 are graphical representations illustrating an example embodiment that may utilize the techniques described herein.

Referring to FIG. 8, shown is a first flowchart of processing steps that may be performed in an embodiment in accordance with techniques herein. The flowchart 700 processing may be performed to periodically collect I/O statistics regarding the I/O workload of the various slices and then further analyze the collected data to determine whether to adjust any slice sizes. At step 702, a determination is made as to whether the next time period has occurred whereby a fixed amount of time has elapsed since the previous time period. If step 702 evaluates to no, control proceeds to step 704 to continue to collect I/O statistics for the slices. If step 702 evaluates to yes, control proceeds to step 706 where the current time period collection is ended and the IOPS/GB, or more generally I/O workload density is calculated for the slices to be assessed in step 708. In step 708, processing is performed to determine whether to adjust sizes of any of the slices.

Figure 9:
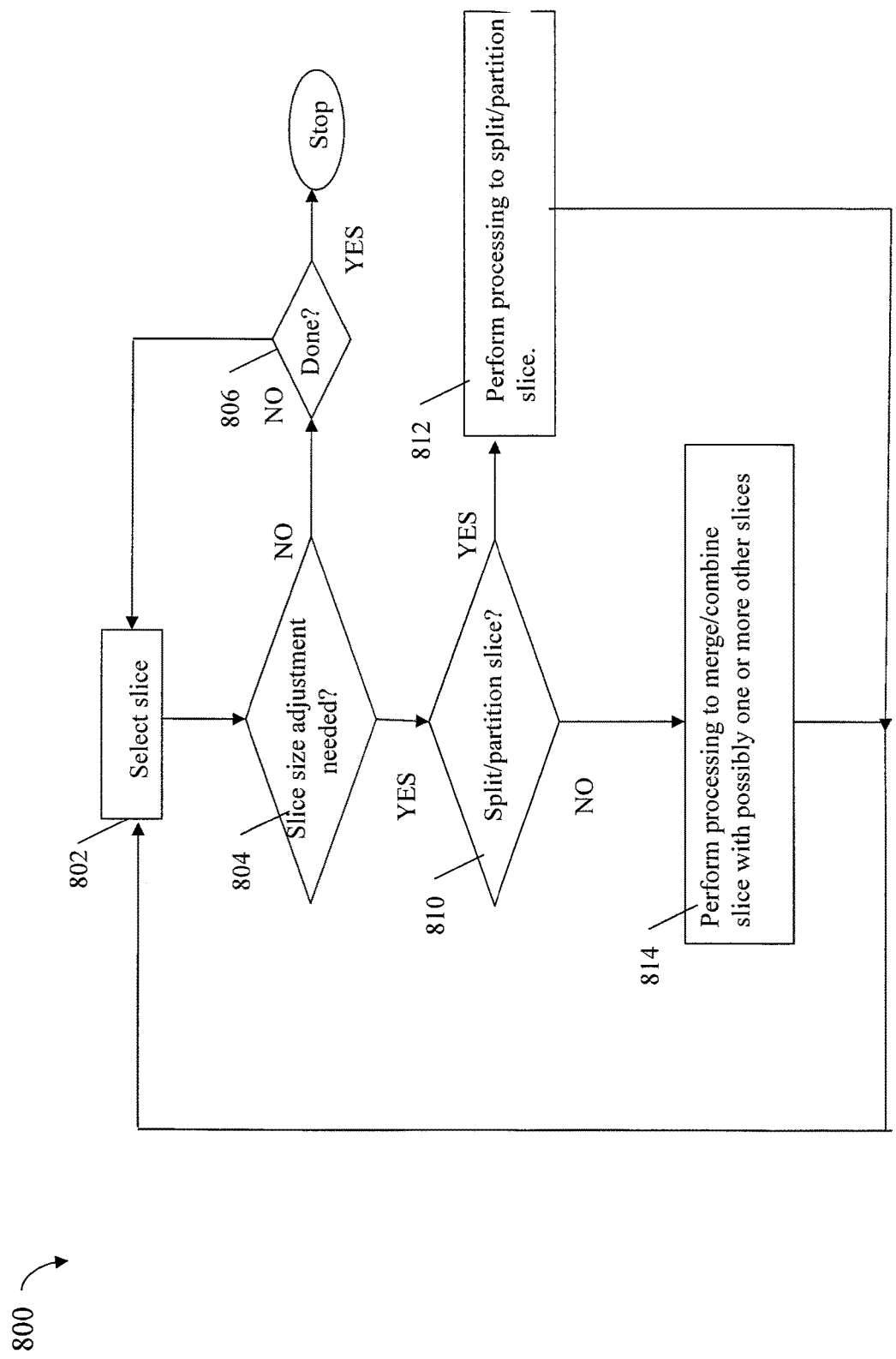

Referring to FIG. 9, shown is a second flowchart of processing steps that may be performed in an embodiment in accordance with techniques herein. The flowchart 800 processing provides more detail of step 708 that may be performed in one embodiment in accordance with techniques herein. At step 802, one of the slices is selected for processing. At step 804, a determination is made as to whether the current slice's size needs adjustment. If step 804 evaluates to no, control proceeds to step 806 where a determination is made as to whether all slices have been processed. If step 806 evaluates to yes, processing stops. If step 806 evaluates to no, control proceeds to step 802 to process the next slices.

If step 804 evaluates to yes, control proceeds to step 810 where a determination is made as to whether the to split or partition the current slice. If step 810 evaluates to yes, control proceeds to step 812 to perform processing to split/partition the current slice. From step 812, control proceeds to step 802. If step 810 evaluates to no, control proceeds to step 814 to perform processing to merge/combine the current slice with possibly one or more other slices. From step 810, control proceeds to step 802.

Figure 10:
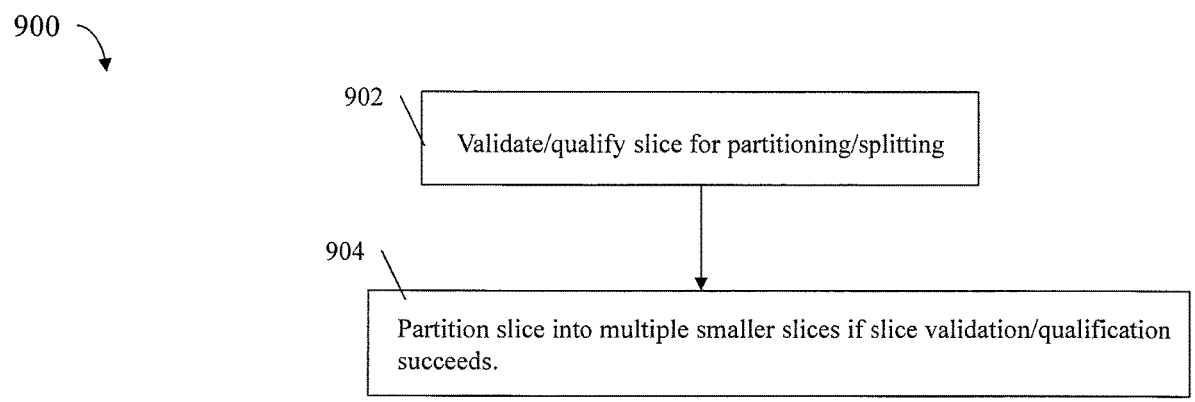
FIG. 10 is an example of a system that may utilize the technique described herein.

Referring to FIG. 10, shown is a third flowchart of processing steps that may be performed in an embodiment in accordance with techniques herein. The flowchart 900 processing is additional detail that may be performed in connection with steps 810 and 812 of FIG. 9 in an embodiment in accordance with techniques herein. At step 902, processing is performed to validate or qualify the current slice for partitioning. At step 904, the slice is partitioned into multiple smaller slices if the slice validation/qualification of step 902 succeeds.

Figure 11:
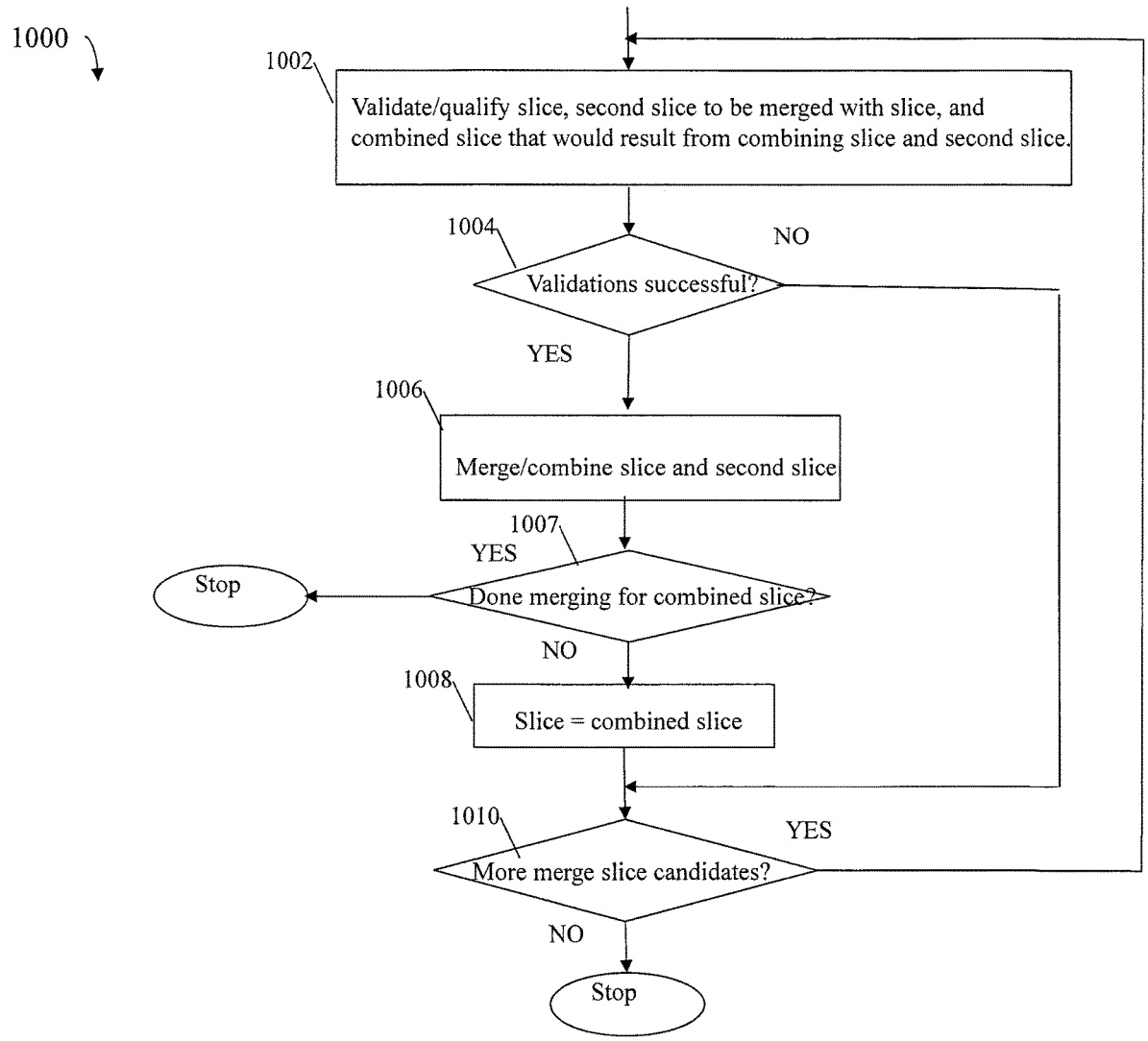
FIG. 11 is a flowchart of the technique illustrating processing steps that may be performed in an embodiment in accordance with techniques herein.

Referring to FIG. 11, shown is a fourth flowchart of processing steps that may be performed in an embodiment in accordance with techniques herein. The flowchart 1000 illustrates in more detail processing may be performed in connection with step 814 of FIG. 9. At step 1002, processing may be performed to validate or qualify each of the current slice, a second slice to potentially be merged with the current slice, and the combined slice that would result from combining the current slice and the second slice. At step 1004, a determination is made as to whether the validations performed in step 1002 are all successful. If step 1004 evaluates to no, control proceeds to step 1010. If step 1004 evaluates to yes, control proceeds to step 1006 where the current slice and the second slice are combined. At step 1007, it is determined whether merging has been completed for the combined slice (e.g. whether the combined slice needs to be considered any further for possible merging with additional adjacent slices). As discussed above, step 1007 may evaluate to yes denoting that merging for the combined slice is complete/done, for example, if the combined slice has an associated IOPS/GB and slice size that matches a corresponding entry in the table 600 of FIG. 6 (e.g., IOPS/ GB of the combined slice are within a predetermined range in column 610 of an entry and the slice size matches the predetermined slice size in column 620 of the same table entry). If step 1007 evaluates to yes, processing stops. If step 1007 evaluates to no, control proceeds to step 1008. At step 1008, the variable current slice is assigned the combined slice. At step 1010, a determination is made as to whether there are any more slice candidates that may be evaluated for possibly merging with the current slice. If step 1010 evaluates to no, merge processing for the current slice stops. If step 1010 evaluates to yes, control proceeds to step 1002 to further evaluate an additional slice (second slice) as a merge candidate.

While the above description refers to a data storage system or array having flash based SSD, the techniques may be similarly applied according to alternative embodiments directed to other systems implementing flash based SSDs such as servers, network processors, compute blocks, converged systems, virtualized systems, and the like. Additionally, it should be appreciated that the technique can apply to block, file, object and/or content architectures.

Figure 12:
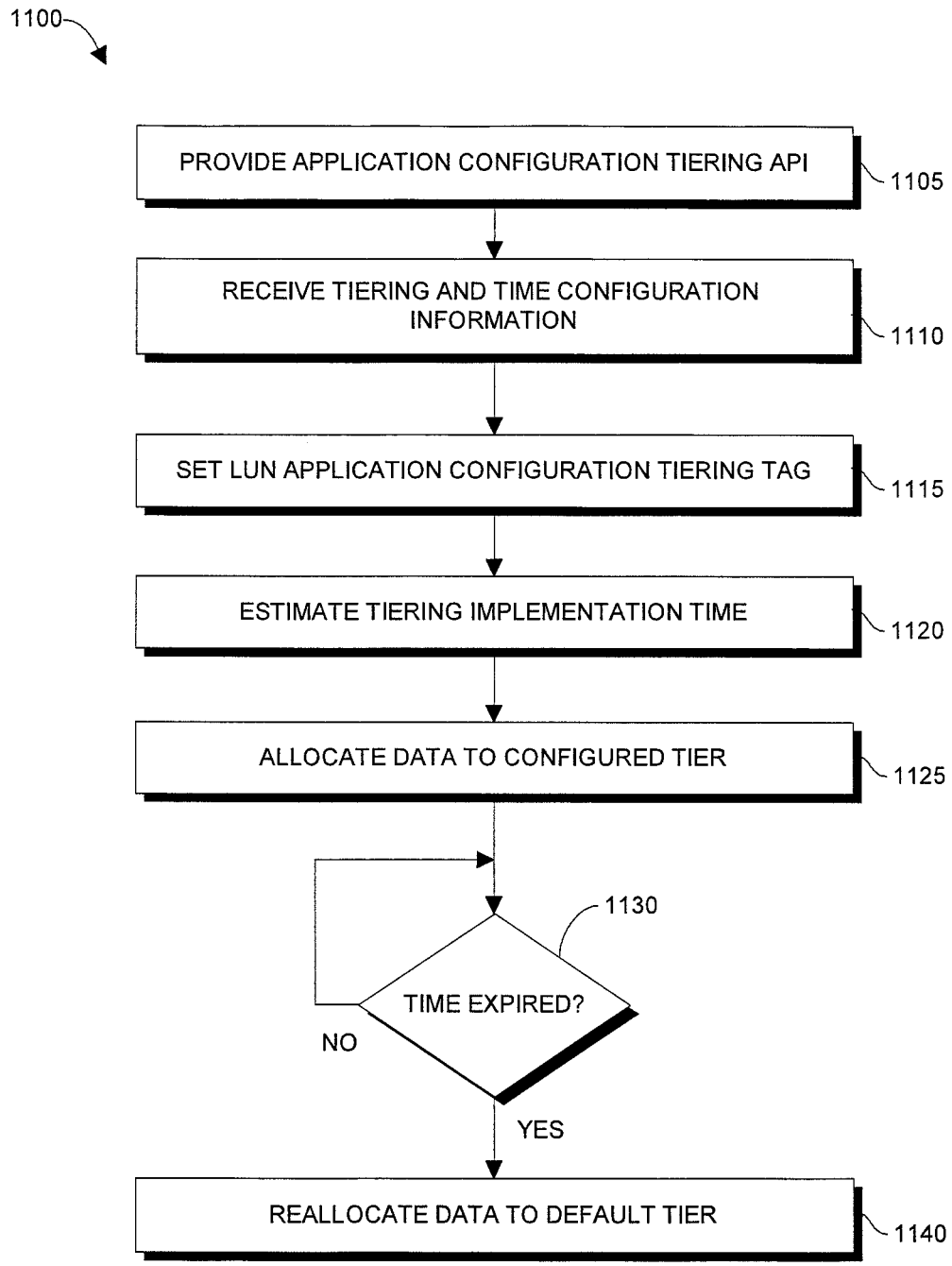
FIG. 12 is a flowchart of another technique illustrating processing steps that may be performed in an embodiment in accordance with techniques herein.

FIG. 12 shows a flowchart of a procedure 1100 which can be performed in connection with the data storage system. At 1105, the system provides an application configuration tiering API. At 1110, the system receives tiering and time configuration information. At 1115, the system sets the LUN application configuration tiering tag. At 1120, the system estimates tiering implementation time. At 1125, the system allocates data to the configured tier. At 1130, the system determines whether time has expired and continues until time expires. At 1140, once time has expired, the system reallocates data to the default tier.

Figure 13:
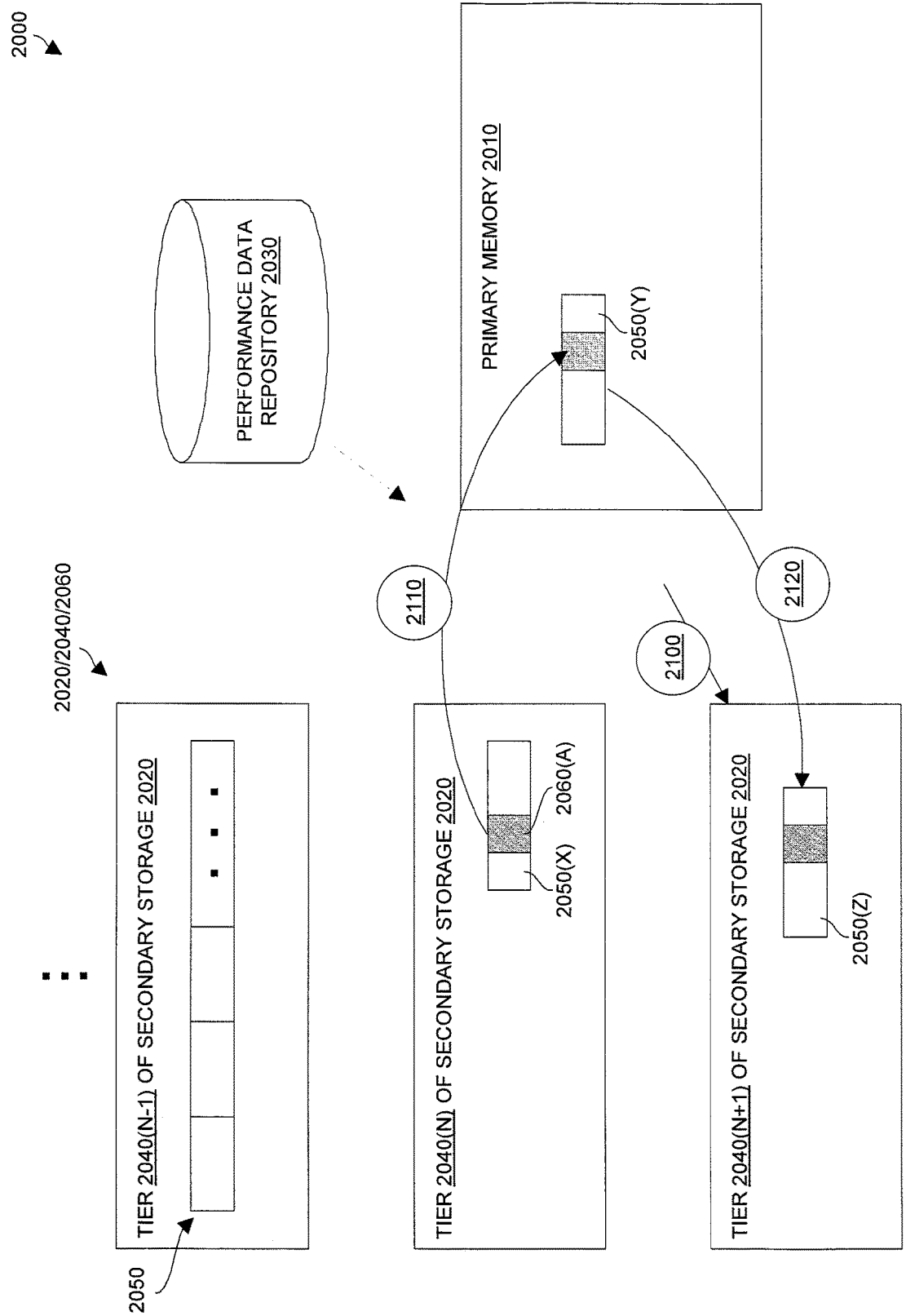
FIG. 13 is a block diagram of an example data storage environment which stores data in storage slices of different sizes within different storage tiers in accordance with an example embodiment.

FIG. 13 shows an example data storage environment 2000 which stores data in slices of different sizes within different storage tiers of secondary memory in accordance with certain example embodiments. Such embodiments provide for autotiering with adaptive granularity (e.g., for separation of read and write hot spots). The data storage environment 2000 includes primary memory 2010, secondary storage 2020, and a performance data repository 2030 (also see FIGS. 1 and 4).

The primary memory 2010 is constructed and arranged to buffer (or cache) data which is being processed by the data storage system 12 (FIG. 1). Such primary memory (also referred to as main memory) 2010 may be formed by extremely fast RAM, or the like.

The secondary storage 2020 is constructed and arranged to store data in a non-volatile manner. To this end, the secondary storage 2020 includes multiple storage tiers . . . , 2040(N−1), 2040(N), 2040(N+1), . . . (collectively, storage tiers 2040) having a particular type of storage device to provide different data access performance (also see the storage array 124 in FIG. 3). By way of example only, the storage tier 2040(N−1) may include enterprise class SSDs for very fast data access (e.g., 10,000-50,000 IOPS), the storage tier 2040(N) may include SAS drives for moderate data access (e.g., 200-500 IOPS), and the storage tier 2040(N+1) may include nearline SAS drives for slower data access (e.g., 100-150 IOPS), and so on.

It should be understood that any number of storage tiers 2040 is suitable for use (e.g., two, three, four, etc.). Additionally, other storage tiers 2040 having other types of storage devices are suitable for use as well, e.g., SATA drives, SLC SSDs, MLC SSDs, and so on.

Each storage tier 2040 stores data in storage slices 2050 (i.e., designated memory locations to hold data) of a particular size or storage slice granularity. For example, one storage tier 2040 may have storage slices 2050 that are 16 MB in size, another storage tier 2040 may have storage slices 2050 that are 64 MB in size, yet another storage tier 2040 may have storage slices 2050 that are 256 MB in size, and so on. A list of suitable storage slice sizes is provided in FIG. 6, and other storage slice sizes are suitable for use as well.

The performance data repository 2030 is constructed and arranged to collect and maintain performance statistics (or data) for the various data 2060 stored by the storage tiers 2040. Such statistics may include a count of the number of times each slice of data 2060 was accessed during (or per) a period of time (e.g., a minute, an hour, a day, a week, etc.), a count of the number of times each slice of data 2060 was read during a period of time, a count of the number of times each slice of data 2060 was written during a period of time, and so on (also see the performance data 136 in FIG. 4). Such historical statistics may be gathered and saved within the performance data repository 2030 even though the size granularity for various data 2060 may be different due to the various data 2060 residing in different tiers 2040 that store slices 2050 of different sizes. Additionally, the performance data repository 2030 may include a set of characteristics (e.g., predefined thresholds, parameters, sizes, etc.) for the data storage environment 2000 such as the maximum or average number of writes per day (WPD) for a particular SSD tier 2040 or SSD (e.g., determined by dividing the number of writes supported by each SSD divided by the stated lifetime in days for the SSD, etc.), and so on.

With the above-described data storage environment 2000 available, circuitry of the data storage system 12 is able to smartly impose slice size constraints on the various storage tiers 2040 to improve performance. Along these lines, during autotiering, the circuitry is able to smartly select an appropriate storage tier 2040 and its associated storage slice size for robust and reliable storage of the slices of data 2060 (e.g., to reduce latency, manage SSD wear, etc.).

By way of example, suppose that the circuitry is tasked with storing particular data 2060(A) which was originally stored in a storage slice 2050(X) of a first size within the storage tier 2040(N). Perhaps that data 2060(A) is being evaluated for possible relocation across different tiers 2040 (e.g., via an auto-tiering operation). Along these lines, the circuitry may access the performance data repository 2030 to assess the access activity for the data 2060(A) while the data 2060(A) currently resides within the storage slice 2050(X) (illustrated by the dashed arrow in FIG. 13). Based on the access activity for the data 2060(A), the circuitry selects a new storage tier 2040 for the data 2060(A) such as the storage tier 2040(N+1) (also see arrow 2100 in FIG. 13 which represents the tier selection operation).

At this time, the circuitry moves the data 2060(A) from the storage slice 2050(X) into the primary memory 2010 (arrow 2110). During this process, the data 2060(A) is placed within another slice structure 2050(Y) within the primary memory 2010 which may have a different size than the storage slice 2050(X). Also at this time and as will be discussed in further detail, the circuitry may further process the data 2060(A) by merging the data 2060(A) with other data 2060 to form a larger slice of data 2060 or partitioning a larger amount of data 2060 into the data 2060(A) and other smaller slices of data 2060. Then, the circuitry stores the data 2060(A) within secondary storage 2020 (arrow 2120). In particular, the circuitry writes the contents of the entire slice structure 2050(Y) into a storage slice 2050(Z) in the selected storage tier 2040(N+1). At this point, the data 2060(A) now resides in a slice 2050(Z) which may be a different size than that of the initial slice 2050(X). Further details will now be provided with reference to FIGS. 13 and 14.

Figure 14:
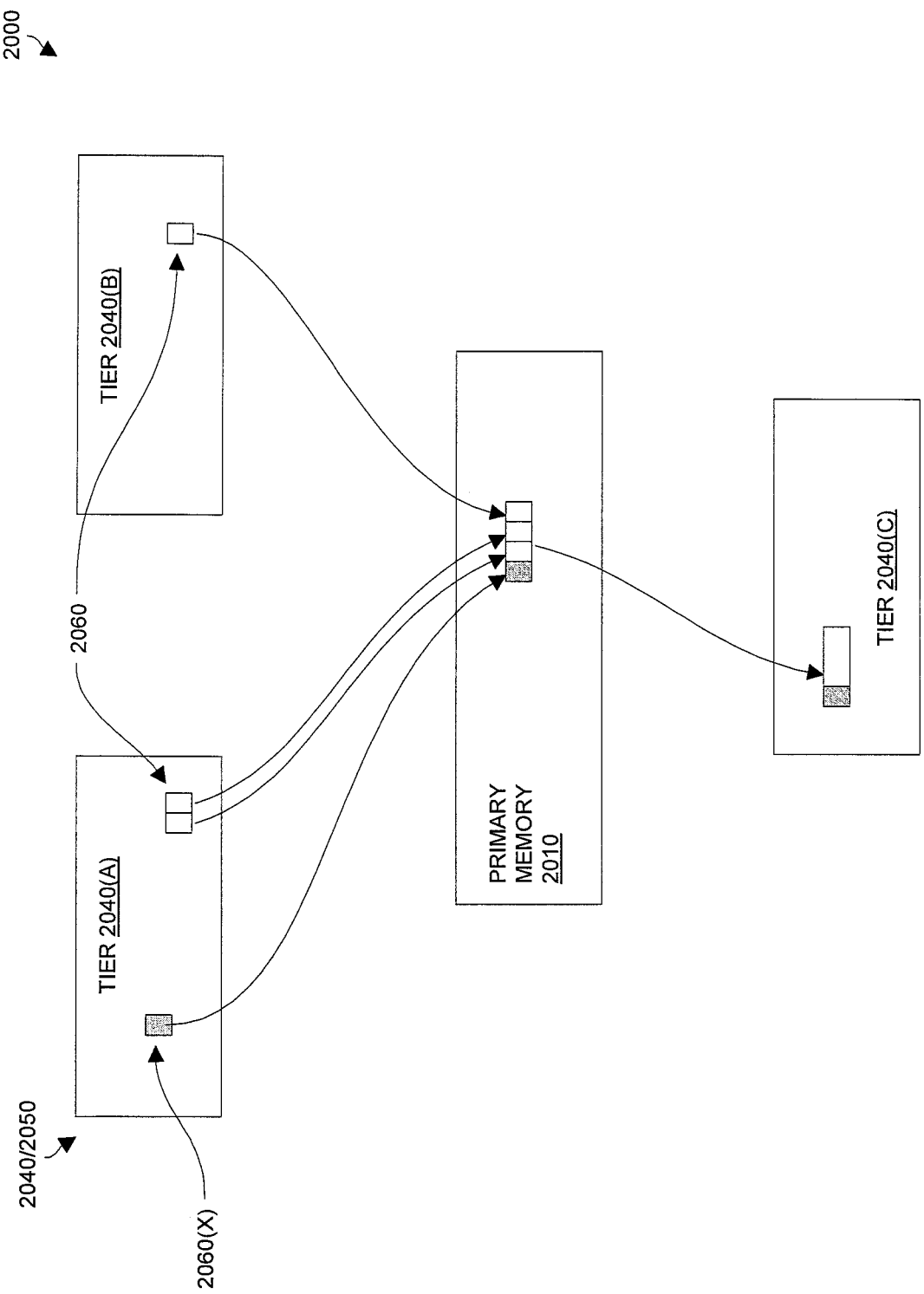
FIG. 14 is a block diagram of a merging operation which merges slices of data of a first size together to form a slice of data of a second size in accordance with an example embodiment.

FIGS. 13 and 14 show different example resizing techniques that can be performed by the data storage circuitry (FIG. 1) on particular data 2060(X) when autotiering that data 2060(X). Such processing may involve combining smaller slices of data 2060 (including the data 2060(X)) into a larger slice of data 2060 before storing that larger slice of data 2060 in a different storage tier 2040 of secondary storage 2020. Similarly, such processing may involve partitioning a larger slice of data 2060 containing the particular data 2060(X) into multiple smaller slices of data 2060 before storing the smaller slices of data 2060 within the tiers 2040. One will appreciate that such operation allows the most effective usage of the storage devices with different sizes and data access characteristics and thus increases performance.

With reference to FIG. 14, in a first example resizing technique, the circuitry autotiers the particular data 2060(X) by moving that data 2060(X) from a first storage tier 2040(A) to a selected new tier 2040(C). Such an autotiering process may be performed if the particular data 2060(X) has become "cold" or less inactive. Along these lines, the circuitry may evict the particular 2060(X) from a faster tier 2040 to a slower tier 2040 to make more room for other data 2060 in the faster tier 2040. For illustration purposes, the particular data 2060(X) remains shaded in FIG. 14.

As shown in FIG. 14, the circuitry reads the particular data 2060(X) as well as other data 2060 from storage slices 2050 having a first size into the primary memory 2010. By way of example, the data 2060 is read from three storage slices 2050 within tier 2040(A) and one storage slice 2050 within tier 2040(B). Also, by way of example, two of the storage slices 2050 within tier 2040(A) are adjacent to each other while one slice 2050 is separate. Other situations are suitable as well (e.g., reading data 2060 from just one tier 2040, from three tiers 2040, etc.). Moreover, it is not necessary for the initial storage slices 2050 that are the sources of the data 2060 to be the same size.

Within the primary memory 2010, the circuitry combines (or merges) the data 2060 together to form a single newly formed slice 2050. Accordingly, this newly formed slice 2050 has a size that is larger than the initial storage slices 2050 that were the sources of the data 2060.

Next, the circuitry writes the newly formed slice 2050 from the primary memory 2010 to the new tier 2040(C) that was selected to hold the data 2060. For example, the new tier 2040(C) may be formed by slower storage devices where storage is less expensive thus enabling the size of the storage slices 2050 within the new tier 2040(C) to be larger for more efficient handling.

It should be understood that four slices of data 2060 (including the particular data 2060(X)) were merged together to form a new slice of data 2060 by way of example only. The circuitry is able to merge other numbers of data slices as well, e.g., one, two, three, five, and so on. In some arrangements, the size of the resulting newly formed slice of data 2060 is a multiple, N, of the size of the smallest original slice of data 2060, e.g., two, four, eight, etc.

Figure 15:
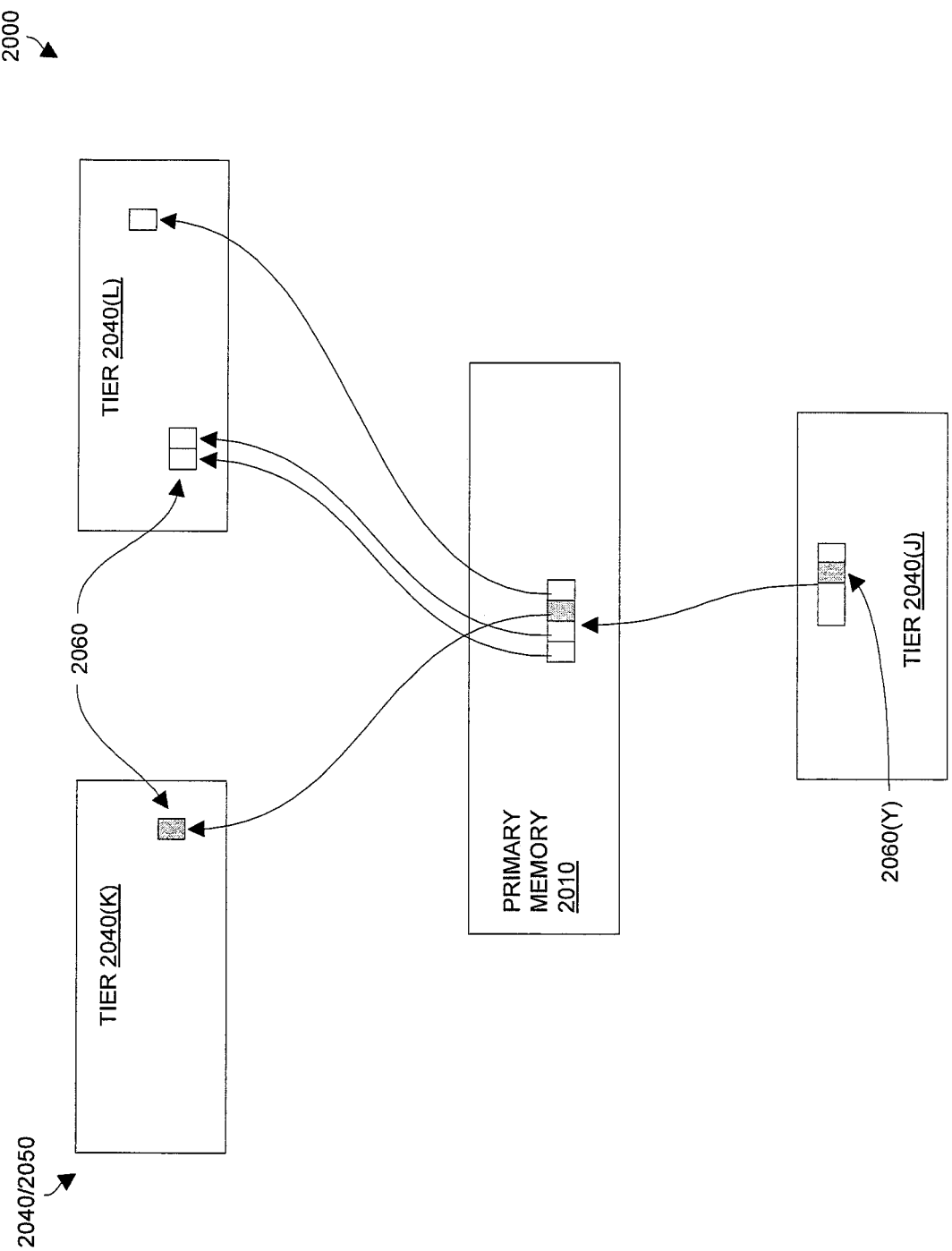
FIG. 15 is a block diagram of a partitioning operation which partitions a slice of data of a first size to form multiple slices of data of a second size in accordance with an example embodiment.

With reference to FIG. 15, in another example resizing technique, the circuitry autotiers particular data 2060(Y) by moving that data 2060(Y) from an initial storage tier 2040(J) to a selected new tier 2040(K). Such an autotiering process may be performed if the particular data 2060(Y) has become "hot" or more active. Along these lines, the circuitry may promote the particular 2060(Y) from a slower tier 2040 to a faster tier 2040 to reduce latency in future access operations. For illustration purposes, the particular data 2060(Y) remains shaded in FIG. 15.

As shown in FIG. 15, the circuitry reads a larger portion of data 2060 that includes the particular data 2060(Y) from an initial storage slice 2050 into the primary memory 2010. As shown, the storage slice 2050 that holds the larger portion of data 2060 has a first size which may be relatively large.

Within the primary memory 2010, the circuitry partitions (or divides) the portion of data 2060 apart to form multiple smaller portions (or slices) of data 2060. Accordingly, each newly formed slice of data 2060 has a size that is smaller than the initial storage slice 2050.

Next, the circuitry writes the newly formed slices of data 2060 from the primary memory 2010 to storage slices 2050 within one or more new tiers 2040 that were selected to hold the newly formed slices of data 2060, e.g., tiers 2040(K) and 2040(L). For example, the new tier 2040(K) may be formed of faster storage devices than those forming the source tier 2040(J). Since such storage is typically at a premium, the smaller slice sizes enable more efficient storage of the hotter data 2060 (i.e., the colder data 2060 adjacent to the hotter data 2060(Y) does not need to be stored with the hotter data 2060(Y)).

It should be understood that the data 2060 within the initial storage slice 2050 was partitioned into four data slices 2060 for storage within smaller storage slices 2050 to enable separation of the particular data 2060(X) from the remaining data 2060 by way of example only. The circuitry is able to divide the data 2060 into other numbers of data slices as well, e.g., two, three, five, and so on. In some arrangements, the size of the initial storage slice 2050 is a multiple, N, of the size of the smallest resulting slice 2050, e.g., two, four, eight, etc.

It should be understood that the circuitry is able to perform more advanced operations as well. For example, in some embodiments, the circuitry partitions initial data 2060 to obtain hot data 2060 from the initial data 2060. The circuitry places the hot data 2060 in a tier 2040 that holds small storage slices 2050. Additionally, the circuitry merges the remaining cold data 2060 with other cold data 2060 and stores this aggregation of cold data 2060 in a different tier 2040 that holds larger storage slices 2050 or storage slices 2050 of equal size to that which held the initial data 2060. Further details will now be provided with reference to FIG. 16.

Figure 16:
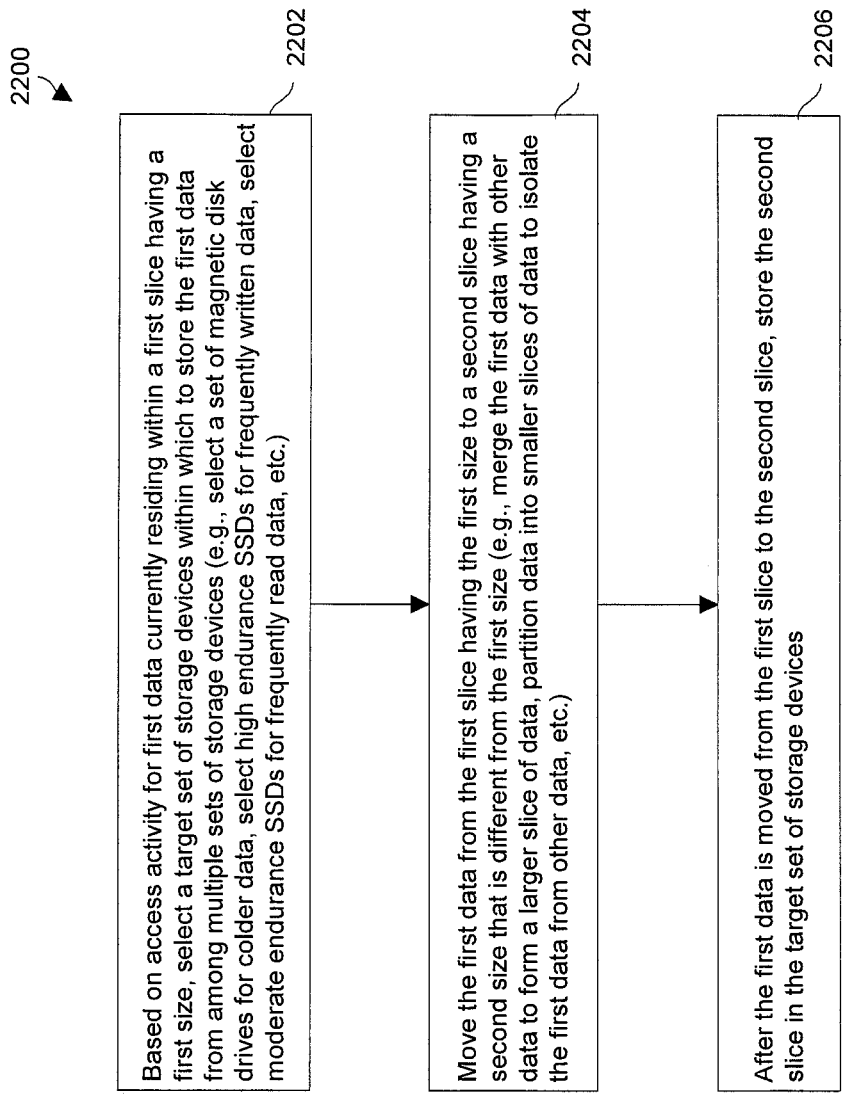
FIG. 16 is a flowchart of a procedure which is performed by computerized circuitry to store data in storage slices of different sizes within different storage tiers in accordance with an example embodiment.

FIG. 16 shows a procedure 2200 which is performed by data storage equipment (e.g., see FIG. 1) to store data in slices of different sizes within different storage tiers to effectively and efficiently manage data. Such a procedure 2200 may be performed during autotiering to smartly locate data among multiple storage tiers.

At 2202, the data storage equipment, based on access activity for first data currently residing within a first slice having a first size, selects a target set of storage devices within which to store the first data from among multiple sets of storage devices (also see arrow 2100 in FIG. 14). Along these lines, by accessing statistics from a performance data repository to determine access characteristics for the first data, the data storage equipment chooses a well-suited set of storage devices to store that data, e.g., HDDs for colder data, high endurance SSDs for frequently read data, moderate endurance SSDs for frequently read data, and so on.

At 2204, the data storage equipment moves the first data from the first slice having the first size to a second slice having a second size that is different from the first size (also see the arrow 2110 in FIG. 13). In some situations, the data may be merged with other data to form a larger slice of data (FIG. 14). In other situations, data may be partitioned into smaller slices of data to isolate the first data from other data (FIG. 15).

At 2206, the data storage equipment, after the first data is moved from the first slice to the second slice, stores the second slice in the target set of storage devices (also see the arrow 2120 in FIG. 13). Accordingly, the first data is properly located for improved performance.

One should appreciate that hybrid arrays are provisioned with drives of different types. Some drive types may be dedicated to storing the performance critical part of the working set and the other drive types may be dedicated to providing greater and cheaper capacity for the rest of the set. An example performance type of drive is solid state drive. An example cost effective large capacity drive is a NL-SAS drive.

In some arrangements, an all flash array can be provisioned with SSDs with different characteristics. For example, the array can have mix of 10, 3 and 0.5 writes per day (WPD) SSDs.

LUNs may be exported to the user (e.g., one or more host computers) by the array and mapped, where different regions of the logical address space are mapped to the different regions of the physical space on the different drives. These regions are often called storage slices.

Some software on the array periodically remaps the LUNs to keep the most actively used data on the fastest drives to maximize the array performance.

In a conventional data storage system, the actively used blocks can occupy the small portion of a slice. However, blocks will be promoted and demoted as a whole. Along these lines, when the data is smaller in size (i.e., smaller granularity), the autotier results are more efficient. Accordingly, users may request reduction in the granularity of autotiering. Unfortunately, such a reduction in the granularity requires more memory to manage slice related information. Thus, even a portion of the fastest drive space may be occupied by not used parts of the slices (e.g., metadata).

Another concern is that different parts of a slice of data can be accessed differently. For example, a slice of data could have different read and write hot spots. But the slice as a whole is simply viewed as actively read and written, which may prevent the more effective placement of the hot spots (e.g., placement of just the write hot spots on 10 WPD SSDs).

In contrast to conventional data storage systems and in accordance with certain embodiments, improved techniques leverage a mechanism that handles different sizes for slices on different tiers as disclosed herein. In particular, a data slice on a given tier could be split into a number of smaller data slices to separate read, write hot spots as well as less active data. Such splitting may be performed multiple times.

Additionally, the less active regions can be combined together to form a new data slice with lower temperature. The new data slice can then be moved to a lower tiers or to less active drives on the same tier. Furthermore, the data with read hot spots can be separated to form actively read data slices. The same can be done to the data with the write hot spots to form actively written data slices. Then, the read and write traffic can be directed to the storage devices with appropriate or corresponding characteristics.

Moreover, the autotiering can combine the smaller data slices into larger data slices. Then the appropriately sized data slices can be placed in appropriate tiers (e.g., based on the number of read and write operations for the data, etc.). Accordingly, read and write operations may be balanced across drives in the most effective way.

Such enhanced data storage systems enable the most effective usage of the drives with the different characteristics and therefore increases array performance. Such operation also decreases the wearing of the drives because of the ability to manage data better. Moreover, such operation may be agnostic to the applications using the array's LUN.

It will be appreciated that an embodiment may implement the techniques herein using code executed by a computer processor. For example, an embodiment may implement the technique herein using code which is executed by a processor of the data storage system. As will be appreciated by those skilled in the art, the code may be stored on the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a data storage system processor.

Furthermore or along these lines, at least some of the components disclosed herein (e.g., the management system 22A, the directors 130-132, the data storage optimizer 135, etc.) may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product is capable of delivering all or portions of various software constructs to such circuitry. In particular, the computer program product has a non-transitory (or non-volatile) computer readable medium which stores a set of instructions which controls one or more operations of the circuitry. Examples of suitable computer readable storage media include tangible articles of manufacture and apparatus which store instructions in a non-volatile manner such as CD-ROM, DVD, flash memory, disk memory, tape memory, and the like.

While various embodiments of the present disclosure have been particularly shown and described, it will be understood by those skilled in the art that various changes in form and details may be made therein without departing from the spirit and scope of the present disclosure as defined by the appended claims.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. In data storage equipment operative to store data within slices of different sizes, a method of managing the data, the method comprising:
based on access activity for first data and access activity for second data, the first data and the second data both residing within a first slice that backs a logical block address (LBA) range of a logical unit (LUN), the first slice having a first size, the first slice stored in a set of storage devices in a first tier, selecting, from among multiple other sets of storage devices, (i) a first target set of storage devices in a second tier within which to store the first data and (ii) a second target set of storage devices in a third tier within which to store the second data, the first tier, the second tier, and the third tier providing respective levels of data access performance;
simultaneously (i) moving the first data from the first slice having the first size to a second slice having a second size, and (ii) moving the second data from the first slice to a third slice having a third size, the second slice backing a first subrange of the LBA range, the third slice backing a second subrange of the LBA range, wherein the first size, the second size, and the third size are different from one another, wherein the second slice is backed by the first target set of storage devices in the second tier, and wherein the third slice is backed by the second target set of storage devices in the third tier; and
storing the second slice in the first target set of storage devices and the third slice in the second target set of storage devices;
wherein selecting the first target set of storage devices and the second target set of storage devices further includes:
based on a set of data structures defining a predetermined relationship between multiple slice sizes and respective ranges of access activity, (i) selecting the second size of the second slice to store the first data, and (ii) selecting the third size of the third slice to store the second data.

2. A method as in claim 1 wherein the data storage equipment includes (i) primary memory and (ii) secondary storage coupled to the primary memory, the secondary storage including multiple sets of storage devices, including the set of storage devices and the multiple other sets of storage devices;
wherein moving the first data from the first slice to the second slice includes reading the first data from a source set of storage devices into the second slice while the second slice resides in the primary memory; and
wherein storing the second slice in the first target set of storage devices includes writing the second slice from the primary memory into the first target set of storage devices.

3. A method as in claim 2
wherein selecting the first target set of storage devices includes performing a tier selection operation to identify, as a destination tier for the first data, the second storage tier based on the access activity for the first data.

4. A method as in claim 3 wherein the source set of storage devices is operative to store slices having the first size;
wherein the first target set of storage devices is operative to store slices having the second size;
wherein the access activity for the first data indicates a decrease in recent access activity for the first data; and
wherein performing the tier selection operation to identify, as the destination tier for the first data, the second storage tier based on the access activity for the first data includes choosing the second storage tier in place of the first storage tier in response to the decrease in recent access activity for the first data.

5. A method as in claim 4 wherein the source set of storage devices provides average data access time that is faster than that of the first target set of storage devices;
wherein the first size is smaller than the second size; and
wherein reading the first data from the source set of storage devices into the second slice while the second slice resides in the primary memory includes merging, within the primary memory, the first slice having the first size with a set of other slices having the first size to form the second slice.

6. A method as in claim 3 wherein the source set of storage devices is operative to store slices having the first size;
wherein the first target set of storage devices is operative to store slices having the second size;
wherein the access activity for the first data indicates an increase in recent access activity for the first data; and
wherein performing the tier selection operation to identify, as the destination tier for the first data, the second storage tier based on the access activity for the first data includes choosing the second storage tier in place of the first storage tier in response to the increase in recent access activity for the first data.

7. A method as in claim 6 wherein the source set of storage devices provides average data access time that is slower than that of the first target set of storage devices;
wherein the first size is larger than the second size; and
wherein reading the first data from the source set of storage devices into the second slice while the second slice resides in the primary memory includes partitioning, within the primary memory, the first slice having the first size into multiple other slices having the second size, the second slice being a particular one of the other slices that contains the first data.

8. A method as in claim 3 wherein the source set of storage devices is operative to store slices having the first size;
wherein the first target set of storage devices is operative to store slices having the second size;
wherein the access activity for the first data indicates higher write activity for the first data relative to other data within the multiple sets of storage devices; and
wherein performing the tier selection operation to identify, as the destination tier for the first data, the second storage tier based on the access activity for the first data includes choosing the second storage tier in place of the first storage tier in response to the higher write activity for the first data relative to the other data within the multiple sets of storage devices.

9. A method as in claim 8 wherein the source set of storage devices provides average data access time that is slower than that of the first target set of storage devices;
wherein the first size is smaller than the second size;
wherein the multiple sets of storage devices includes a set of single-level cell solid state drives and a set of multi-level cell solid state drives; and
wherein choosing the second storage tier includes picking the set of single-level cell solid state drives, as the first target set of storage devices, over the set of multi-level cell solid state drives.

10. A method as in claim 3 wherein the source set of storage devices is operative to store slices having the first size;
wherein the first target set of storage devices is operative to store slices having the second size;
wherein the access activity for the first data indicates higher read activity for the first data relative to other data within the multiple sets of storage devices; and
wherein performing the tier selection operation to identify, as the destination tier for the first data, the second storage tier based on the access activity for the first data includes choosing the second storage tier in place of the first storage tier in response to the higher read activity for the first data relative to the other data within the multiple sets of storage devices.

11. A method as in claim 10 wherein the source set of storage devices provides average data access time that is slower than that of the first target set of storage devices;
wherein the first size is smaller than the second size;
wherein the multiple sets of storage devices includes a set of single-level cell solid state drives and a set of multi-level cell solid state drives; and
wherein choosing the second storage tier includes picking the set of multi-level cell solid state drives, as the first target set of storage devices, over the set of single-level cell solid state drives.

12. A method as in claim 2 wherein the data storage equipment is operative to receive host input/output (I/O) requests from a set of host computers, and store host data within the secondary storage and load the host data from the secondary storage in response to the host I/O requests; and
wherein the method further comprises:
updating a performance data repository in response to each host I/O request from the set of host computers.

13. A method as in claim 12 wherein selecting the first target set of storage devices within which to store the first data from among the multiple sets of storage devices includes:
accessing the performance data repository to identify a set of I/O statistics for the first data, and
selecting the first target set of storage devices from the multiple sets of storage devices based on the set of I/O statistics for the first data.

14. A method as in claim 12 wherein the first size is a multiple, N, of the second size, where N is an integer that is greater than 1.

15. A method as in claim 12 wherein the second size is a multiple, N, of the first size, where N is an integer that is greater than 1.

16. A method as in claim 12 wherein the secondary storage includes a set of solid state drives and a set of magnetic disk drives;
wherein reading the first data from the source set of storage devices includes retrieving the first data from one of the set of solid state drives and the set of magnetic disk drives into the primary memory; and
wherein storing the second slice in the first target set of storage devices includes flushing the second slice from the primary memory to the other of the set of solid state drives and the set of magnetic disk drives into the primary memory.

17. A method as in claim 12 wherein the secondary storage includes a set of single-level cell solid state drives and a set of multi-level cell solid state drives;
wherein reading the first data from the source set of storage devices includes retrieving the first data from one of the set of single-level cell solid state drives and the set of multi-level cell solid state drives into the primary memory; and
wherein storing the second slice in the first target set of storage devices includes flushing the second slice from the primary memory to the other of the set of single-level cell solid state drives and the set of multi-level cell solid state drives.

18. Data storage equipment, comprising:
a performance data repository;
memory; and
control circuitry coupled to the performance data repository and the memory, the memory storing instructions which, when carried out by the control circuitry, cause the control circuitry to perform acts comprising:
based on access activity read from the performance data repository for first data and access activity read from the performance data repository for second data, the first data and the second data both residing within a first slice that backs a logical block address (LBA) range of a logical unit (LUN), the first slice having a first size, the first slice stored in a set of storage devices in a first tier, selecting, from among multiple other sets of storage devices, (i) a first target set of storage devices in a second tier within which to store the first data and (ii) a second target set of storage devices in a third tier within which to store the second data, the first tier, the second tier, and the third tier providing respective levels of data access performance,
simultaneously, (i) moving the first data from the first slice having the first size to a second slice having a second size, and (ii) moving second data from the first slice to a third slices slice having a third size, the second slice backing a first subrange of the LBA range, the third slice backing a second subrange of the LBA range, wherein the first size, the second size, and the third size are different from one another, wherein the second slice is backed by the first target set of storage devices in the second tier, and wherein the third slice is backed by the second target set of storage devices in the third tier, and
storing the second slice in the first target set of storage devices and the third slice in the second target set of storage devices;
wherein selecting the first target set of storage devices and the second target set of storage devices further includes:
based on a set of data structures defining a predetermined relationship between multiple slice sizes and respective ranges of access activity, (i) selecting the second size of the second slice to store the first data, and (ii) selecting the third size of the third slice to store the second data.

19. A computer program product having a non-transitory computer readable medium which stores a set of instructions to store data within slices of different sizes; the set of instructions, when carried out by computerized circuitry, causing the computerized circuitry to perform a method of:
based on access activity for first data and access activity for second data, the first data and the second data both residing within a first slice that backs a logical block address (LBA) range of a logical unit (LUN), the first slice having a first size, the first slice stored in a set of storage devices in a first tier, selecting, from among multiple other sets of storage devices, (i) a first target set of storage devices in a second tier within which to store the first data and (ii) a second target set of storage devices in a third tier within which to store the second data, the first tier, the second tier, and the third tier providing respective levels of data access performance;

simultaneously, (i) moving the first data from the first slice having the first size to a second slice having a second size, and (ii) moving second data from the first slice to a third slice having a third size, the second slice backing a first subrange of the LBA range, the third slice backing a second subrange of the LBA range, wherein the first size, the second size, and the third size are different from one another, wherein the second slice is backed by the first target set of storage devices in the second tier, and wherein the third slice is backed by the second target set of storage devices in the third tier; and storing the second slice in the first target set of storage devices and the third slice in the second target set of storage devices;

wherein selecting the first target set of storage devices and the second target set of storage devices further includes:
based on a set of data structures defining a predetermined relationship between multiple slice sizes and respective ranges of access activity, (i) selecting the second size of the second slice to store the first data, and (ii) selecting the third size of the third slice to store the second data.

20. A method as in claim 3 wherein the data storage equipment is operative to receive host input/output (I/O) requests from a set of host computers, and store host data within the secondary storage and load the host data from the secondary storage in response to the host I/O requests; and
wherein the method further comprises:
updating a performance data repository in response to each host I/O request from the set of host computers.

21. A method as in claim 1 wherein moving the first data from the first slice to the second slice includes:
transferring, as at least some of the contents of the first slice, the first data to a primary memory slice in primary memory, the primary memory slice having the second size that is different from the first size; and
transferring contents from the primary memory slice in primary memory to the second slice in the first target set of storage devices.

22. A method as in claim 1 wherein the first data has a size that is different from both the first size and the second size.

23. A method as in claim 1 wherein choosing the first target set of storage devices includes:
comparing the average access rate per unit of storage space metric for the first data to a plurality of metric ranges;
selecting a slice size based on a result of comparing the average access rate per unit of storage space metric for the first data to the plurality of metric ranges; and
identifying the first target set of storage devices from a plurality of storage devices based on the selected slice size.

24. A method as in claim 23 wherein the average access rate per unit of storage space metric for the first data is average input/output operations per second per gigabyte (IOPS/GB); and
wherein selecting the slice size includes:
locating an entry within a mapping table having a plurality of entries that map the plurality of metric ranges to a plurality of slice sizes, the entry corresponding to a particular metric range, and the metric falling within the particular metric range.

25. A method as in claim 23 wherein the first target set of storage devices forms the first storage tier;
wherein storing the second slice in the first target set of storage devices includes placing data of the second slice into the first storage tier; and
wherein the method further comprises:
before selecting the first target set of storage devices, partitioning third data residing within a fourth slice that is larger than the first slice into the first data and fourth data; and
when the first data is moved to the second slice and the data of the second slice is placed into the first storage tier, moving the fourth data into a second storage tier that is different from the first storage tier.

26. A method as in claim 23 wherein the first slice is in the first storage tier; and
wherein moving the first data from the first slice includes:
reading the first data from the first storage tier; and
combining the first data read from the first storage tier with other data read from the second storage tier that is different from the first storage tier to form the second slice.

27. A method as in claim 1 wherein simultaneously (i) moving the first data and (ii) moving the second data includes:
moving data of first slice into primary memory;
partitioning, in the primary memory, the data of the first slice into uniformly sized portions, a first portion including the first data and a second portion including the second data; and
inserting, based on access activity, the first portion into the second slice and the second portion into the third slice.

* * * * *